US012561943B2

(12) United States Patent
Kobayashi et al.

(10) Patent No.: US 12,561,943 B2
(45) Date of Patent: Feb. 24, 2026

(54) INFORMATION PROCESSING APPARATUS AND INFORMATION PROCESSING METHOD

(71) Applicant: Sony Semiconductor Solutions Corporation, Kanagawa (JP)

(72) Inventors: Toshihiro Kobayashi, Tokyo (JP); Tsutomu Shimosato, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 340 days.

(21) Appl. No.: 18/553,077

(22) PCT Filed: Feb. 21, 2022

(86) PCT No.: PCT/JP2022/006854
§ 371 (c)(1),
(2) Date: Sep. 28, 2023

(87) PCT Pub. No.: WO2022/215371
PCT Pub. Date: Oct. 13, 2022

(65) Prior Publication Data
US 2024/0193908 A1     Jun. 13, 2024

(30) Foreign Application Priority Data

Apr. 9, 2021     (JP) ................................. 2021-066798

(51) Int. Cl.
*G06V 10/60*          (2022.01)
*G06F 3/01*           (2006.01)
(Continued)

(52) U.S. Cl.
CPC .............. *G06V 10/60* (2022.01); *G06F 3/013* (2013.01); *G06T 3/40* (2013.01); *G06T 7/579* (2017.01);
(Continued)

(58) Field of Classification Search
CPC ......... G06V 10/60; G06T 7/579; G06T 3/013; G06T 3/40; H04N 25/707; H04N 25/50; H04N 23/95
(Continued)

(56) References Cited

U.S. PATENT DOCUMENTS 11,895,413 B2 *   2/2024   Wong ..................... H04N 25/77
2018/0101154 A1   4/2018   Nomoto
(Continued)

FOREIGN PATENT DOCUMENTS

JP          2018022935 A        2/2018
JP          2020088724 A        6/2020
(Continued)

OTHER PUBLICATIONS

International Search Report (PCT/ISA/210), International Application No. PCT/JP2022/006156, dated May 17, 2022.
(Continued)

*Primary Examiner* — Gabriel I Garcia
(74) *Attorney, Agent, or Firm* — Michael Best & Friedrich LLP

(57) ABSTRACT

Information processing that suppresses increased power consumption is disclosed. In one example, an information processing apparatus includes a hybrid sensor with photo-electric conversion units (PDs) that convert incident light, and a processor that acquires, based on outputs of the PDs, a luminance signal or an event signal based on a luminance change. The processor performs predetermined processing based on the luminance signal or the event signal. A request to read the luminance signal is made when the predetermined processing based on the event signal fails, and the predetermined processing based on the luminance signal following the request is then performed.

15 Claims, 30 Drawing Sheets

(51) Int. Cl.

| | | |
|---|---|---|
| *G06T 3/40* | (2006.01) | |
| *G06T 7/579* | (2017.01) | |
| *H04N 23/95* | (2023.01) | |
| *H04N 25/50* | (2023.01) | |
| *H04N 25/707* | (2023.01) | |

(52) U.S. Cl.
CPC ............. *H04N 23/95* (2023.01); *H04N 25/50* (2023.01); *H04N 25/707* (2023.01)

(58) Field of Classification Search
USPC ........................................................ 382/274
See application file for complete search history.

(56) References Cited

U.S. PATENT DOCUMENTS

| | | | | |
|---|---|---|---|---|
| 2019/0355169 | A1 | 11/2019 | Sapienza | |
| 2019/0356849 | A1* | 11/2019 | Sapienza | ................ H04N 23/65 |
| 2020/0014836 | A1* | 1/2020 | Das | ........................ H04N 5/144 |
| 2020/0026349 | A1 | 1/2020 | Fontanel | |
| 2020/0358977 | A1 | 11/2020 | Niwa | |
| 2022/0030190 | A1 | 1/2022 | Hizu | |
| 2022/0141381 | A1 | 5/2022 | Nakagawa | |
| 2022/0279137 | A1* | 9/2022 | Lasiter | ................ H10F 39/8063 |

FOREIGN PATENT DOCUMENTS

| | | | |
|---|---|---|---|
| JP | 2021034933 | A | 3/2021 |
| JP | 2021044599 | A | 3/2021 |
| WO | WO-2020066433 | A1 | 4/2020 |
| WO | WO-2020101892 | A1 | 5/2020 |
| WO | WO-2020184049 | A1 | 9/2020 |

OTHER PUBLICATIONS

D. Gehrig, H. Rebecq, G. Gallego, D. Scaramuzza, "EKLT: Asynchronous Photometric Feature Tracking Using Events and Frames," European Conference on Computer Vision (ECCV), Munich, 2018.

* cited by examiner

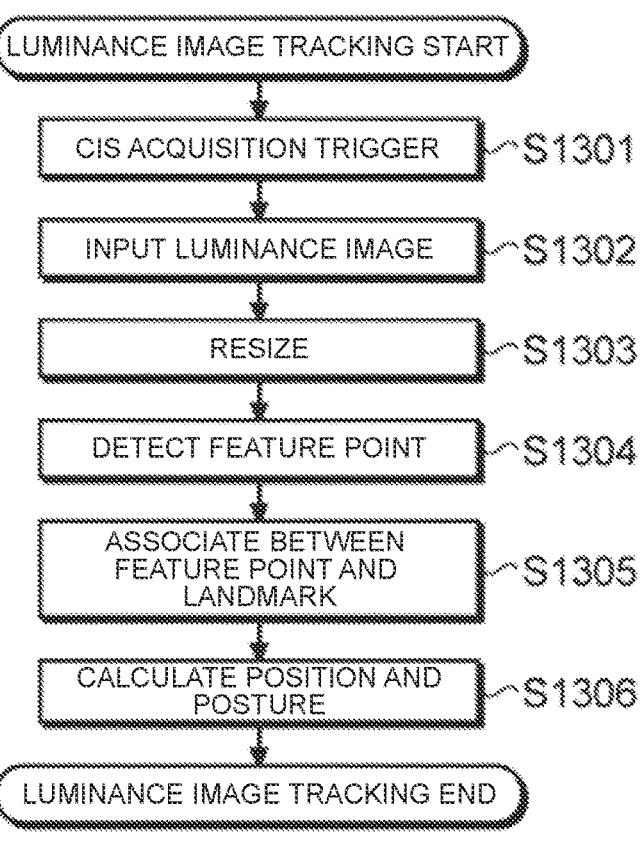

LUMINANCE IMAGE TRACKING START

CIS ACQUISITION TRIGGER — S1301

INPUT LUMINANCE IMAGE — S1302

RESIZE — S1303

DETECT FEATURE POINT — S1304

ASSOCIATE BETWEEN FEATURE POINT AND LANDMARK — S1305

CALCULATE POSITION AND POSTURE — S1306

LUMINANCE IMAGE TRACKING END

FIG.36

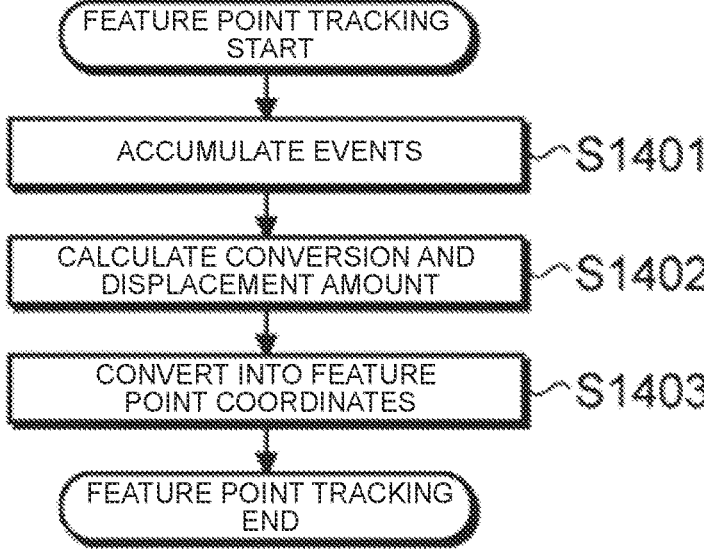

FEATURE POINT TRACKING START

ACCUMULATE EVENTS — S1401

CALCULATE CONVERSION AND DISPLACEMENT AMOUNT — S1402

CONVERT INTO FEATURE POINT COORDINATES — S1403

FEATURE POINT TRACKING END

INFORMATION PROCESSING APPARATUS AND INFORMATION PROCESSING METHOD

FIELD

The present disclosure relates to an information processing apparatus and an information processing method.

BACKGROUND

Conventionally, in the fields of augmented reality (AR), virtual reality (VR), automatic driving, and Internet of Things (IoT), eye tracking for tracking a user's line-of-sight direction and a region of interest from an image acquired by an image sensor has attracted attention. In addition to the above-described fields, in the field of autonomous moving bodies such as a robot vacuum cleaner and a pet robot in home, a transportation robot in a factory and a distribution warehouse, an aerial drone, and an underwater drone, simultaneous localization and mapping (SLAM) that simultaneously performs self-localization and environmental map generation on the basis of an image acquired by an image sensor has attracted attention.

In techniques such as the eye tracking and the SLAM, feature detection is performed on the image acquired by the image sensor, and various types of processing such as tracking of a user's line-of-sight direction and a region of interest, self-localization, and environmental map generation are executed on the basis of detected feature points.

Furthermore, in recent years, a technique for performing feature detection on an image acquired by an EVS capable of generating an image at a frame rate faster than that of a general image sensor has been developed.

CITATION LIST

Patent Literature

Patent Literature 1: US 2019/355169 A
Patent Literature 2: US 2020/026349 A

Non Patent Literature

Non Patent Literature 1: D. Gehrig, H. Rebecq, G. Gallego, D. Scaramuzza, "EKLT: Asynchronous Photometric Feature Tracking Using Events and Frames," European Conference on Computer Vision (ECCV), Munich, 2018.

SUMMARY

Technical Problem

However, in a case where a plurality of sensors having different scenes to be used are provided as in the image sensor and the EVS, there is a problem in that wasteful power consumption occurs and power consumption increases if the sensor that is not used is always turned on.

Therefore, the present disclosure proposes an information processing apparatus and an information processing method capable of suppressing an increase in power consumption.

Solution to Problem

To solve the problems described above, an information processing apparatus according to an embodiment of the present disclosure includes: a hybrid sensor including a plurality of photoelectric conversion units configured to photoelectrically convert incident light, and a signal processing unit configured to acquire, based on outputs of the plurality of photoelectric conversion units, a luminance signal based on a light intensity of the incident light or an event signal based on a luminance change; a processor configured to perform predetermined processing based on the luminance signal or the event signal acquired by the signal processing unit; and an instruction generation unit configured to request the signal processing unit to read the luminance signal, wherein the instruction generation unit requests the signal processing unit to read the luminance signal when the processor fails in the predetermined processing based on the event signal, and the processor executes the predetermined processing based on the luminance signal input from the signal processing unit in response to the request.

BRIEF DESCRIPTION OF DRAWINGS

FIG. 18 is a block diagram illustrating a system configuration example of a device according to the embodiment of the present disclosure.

FIG. 35 is a flowchart illustrating an example of luminance image tracking according to the embodiment of the present disclosure.

FIG. 36 is a flowchart illustrating an example of feature point tracking according to the embodiment of the present disclosure.

DESCRIPTION OF EMBODIMENTS

Figure 1:
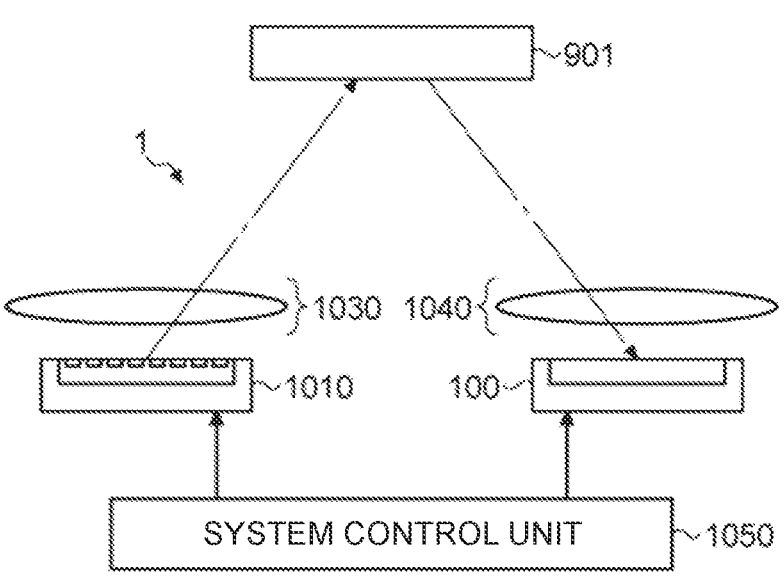
FIG. 1 is a schematic diagram illustrating a schematic configuration example of an information processing apparatus equipped with a solid-state imaging device according to an embodiment of the present disclosure.

Hereinafter, embodiments of the present disclosure will be described in detail with reference to the drawings. It is noted that, in each of the following embodiments, the same parts are denoted by the same reference numerals, and redundant description will be omitted.

In addition, the present disclosure will be described according to the following item order.

0. Introduction
1. An embodiment
1.1 System configuration example
1.2 Configuration example of solid-state imaging device
1.2.1 Example of pixel separation configuration
1.2.2 Example of pixel sharing configuration
1.3 Stacked structure example of solid-state imaging device
1.4 Circuit configuration example of unit pixel
1.4.1 Case of pixel separation configuration
1.4.1.1 Luminance pixel
1.4.1.2 Event pixel
1.4.1.2.1 Configuration example of address event detection circuit
1.4.1.2.2 Configuration example of light receiving circuit
1.4.1.2.3 Modification of light receiving circuit
1.4.2 Case of pixel sharing configuration
1.4.3 Modification regarding pixel sharing
1.5 Example of pixel array
1.5.1 Case of pixel separation configuration
1.5.2 Case of pixel sharing configuration
1.6 Application example of information processing apparatus
1.6.1 Eye tracking
1.6.1.1 Example of device
1.6.1.2 Example of system configuration
1.6.1.3 Example of eye tracking configuration
1.6.1.4 Example of operation flow
1.6.2 SLAM
1.6.2.1 Example of device
1.6.2.2 Example of system configuration and SLAM configuration
1.6.2.3 Example of operation flow
1.7 Summary
2. Application example to moving body

0. Introduction

Even in a case where eye tracking or SLAM is performed using an EVS, at the time of initialization immediately after activation or when a line-of-sight direction/region of interest, a self-position, or the like is lost, it is necessary to respecify the line-of-sight direction/region of interest, the self-position, or the like of the user by using image data acquired by an image sensor that generates normal image data. That is, even when the eye tracking or the SLAM is performed using the EVS, it is necessary to provide the image sensor as a sensor.

However, in a case where a plurality of sensors (image sensor, EVS) having different scenes to be used are provided, there is a problem in that wasteful power consumption occurs and power consumption increases if a sensor that is not used is always turned on.

Furthermore, in eye tracking, SLAM, and the like, in order to implement continuous tracking of the line-of-sight direction/region of interest, estimation of the self-position, and the like while including switching of the sensor (image sensor, EVS), it is necessary to match coordinate systems of the image data acquired by the respective sensors, but the image sensor and the EVS are usually disposed on physically separated different chips (for example, refer to Patent Literature 1). Therefore, the optical axis of the image sensor and the optical axis of the EVS do not match each other, and processing for causing the coordinate systems of the image data acquired by the image sensor and the EVS to match each other becomes complicated. As a result, even if the frame rate is improved using the EVS, there is a problem in that an increase in the processing speed is suppressed by the processing for matching the coordinate systems.

Therefore, in the following embodiments, an information processing apparatus and an information processing method capable of suppressing an increase in power consumption are proposed. In addition, in some or all of the following embodiments, an information processing apparatus and an information processing method capable of improving the processing speed are proposed.

1. An Embodiment

Hereinafter, an information processing apparatus and an information processing method according to an embodiment of the present disclosure will be described in detail with reference to the drawings. In the present embodiment, a solid-state imaging device having a hybrid structure in which an EVS that detects an event on the basis of a luminance change and an image sensor that detects luminance and generates image data are incorporated in a single chip will be exemplified. It is noted that, in the following description, a complementary metal-oxide semiconductor (CMOS) image sensor (hereinafter, simply referred to as an image sensor) is exemplified as an image sensor, but the image sensor is not limited thereto. For example, various sensors including a photoelectric conversion element, such as a charge-coupled device (CCD) image sensor and a time-of-flight (ToF) sensor, can be adopted.

1.1 System Configuration Example

Figure 2:
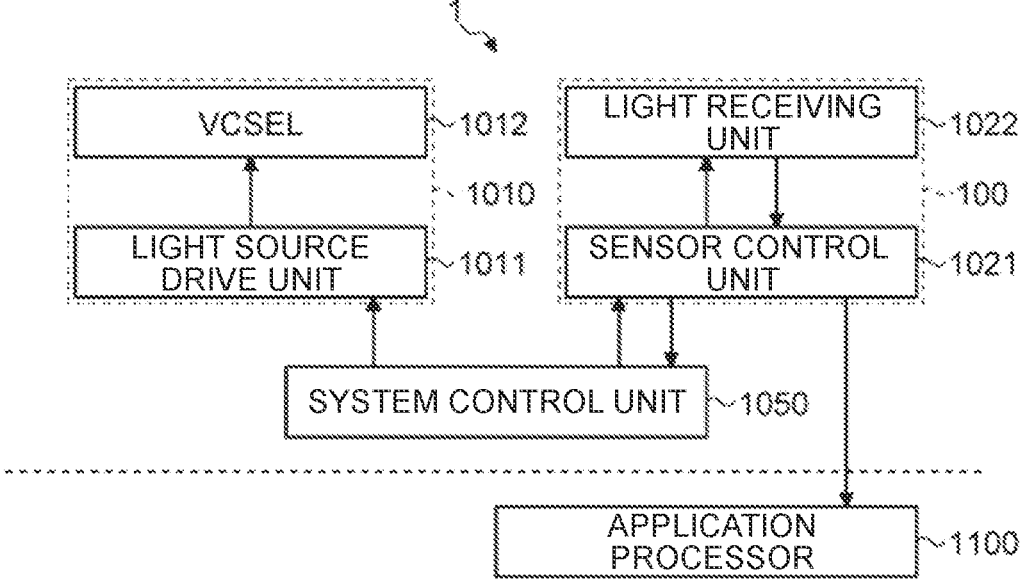
FIG. 2 is a block diagram illustrating a system configuration example of the information processing apparatus according to the embodiment of the present disclosure.

FIG. 1 is a schematic diagram illustrating a schematic configuration example of an information processing apparatus equipped with a solid-state imaging device according to the present embodiment, and FIG. 2 is a block diagram illustrating a system configuration example of the information processing apparatus according to the present embodiment.

As illustrated in FIG. 1, an information processing apparatus 1 according to the present embodiment includes a light source 1010, an irradiation lens 1030, an imaging lens 1040, a solid-state imaging device 100, and a system control unit 1050. It is noted that the irradiation lens 1030 is not an essential component and may be omitted.

As illustrated in FIG. 2, the light source 1010 includes, for example, a vertical cavity surface emitting laser (VCSEL) 1012 and a light source drive unit 1011 that drives the VCSEL 1012. However, the present disclosure is not limited to the VCSEL 1012, and various light sources such as a light emitting diode (LED) may be used. Furthermore, the light source 1010 may be any one of a point light source, a surface light source, and a line light source. In the case of the surface light source or the line light source, the light source 1010 may have, for example, a configuration in which a plurality of point light sources (for example, VCSELs) are arranged one-dimensionally or two-dimensionally. It is noted that, in the present embodiment, the light source 1010 emits, for example, infrared (IR) light. However, the present disclosure is not limited thereto, and the light emitted from the light source 1010 may be light of a wavelength band different from a wavelength band of visible light.

The irradiation lens 1030 is disposed on the emission surface side of the light source 1010, and converts the light emitted from the light source 1010 into irradiation light having a predetermined divergence angle.

The imaging lens 1040 is disposed on the light receiving surface side of the solid-state imaging device 100, and forms an image by incident light on the light receiving surface of the solid-state imaging device 100. The incident light can also include reflected light emitted from the light source 1010 and reflected by a subject 901. For example, in the case of eye tracking, the subject 901 may be an object existing around the user's eye including the eyeball, and in the case of SLAM, the same may be an object existing around the self-position. However, the object is not limited thereto, and various objects can be the subject 901 according to the purpose of use of the information processing apparatus 1.

Although details will be described later, as illustrated in FIG. 2, the solid-state imaging device 100 includes, for example, a light receiving unit 1022 in which a pixel for detecting luminance (hereinafter, referred to as a luminance pixel) and a pixel for detecting an event (hereinafter, referred to as an event pixel) are arranged in a two-dimensional lattice pattern, and a sensor control unit 1021 configured to generate image data based on a luminance signal detected by the luminance pixel (hereinafter, referred to as image frame data) and data based on event data detected by the event pixel (hereinafter, referred to as event frame data) by driving the light receiving unit 1022. It is noted that, although details will be described later, a configuration including a luminance pixel (also referred to as a first pixel) may form an image sensor (also referred to as a first sensor), and a configuration including an event pixel (also referred to as a second pixel) may form an EVS (also referred to as a second sensor).

The system control unit 1050 includes, for example, a processor such as a central processing unit (CPU), and drives the VCSEL 1012 via the light source drive unit 1011. Furthermore, the system control unit 1050 acquires image frame data by controlling the solid-state imaging device 100.

For example, the irradiation light emitted from the light source 1010 is projected onto a subject (also referred to as a target to be measured or an object) 901 through the irradiation lens 1030. The projected light is reflected by the subject 901. Then, the light reflected by the subject 901 passes through the imaging lens 1040 and is incident on the solid-state imaging device 100. The EVS in the solid-state imaging device 100 receives the reflected light reflected by the subject 901 to generate event data, and generates event frame data, which is one image, on the basis of the generated event data. Meanwhile, the image sensor in the solid-state imaging device 100 receives, for example, visible light in the incident light and generates image frame data. The image frame data and the event frame data generated by the solid-state imaging device 100 are supplied to an application processor 1100 of the information processing apparatus 1. The application processor 1100 executes predetermined processing such as image processing and recognition processing on the image frame data and the event frame data input from the solid-state imaging device 100.

1.2 Configuration Example of Solid-State Imaging Device

Next, a configuration example of the solid-state imaging device according to the present embodiment will be described. As a configuration of the solid-state imaging device according to the present embodiment, a configuration in which the luminance pixel and the event pixel respectively include separate photoelectric conversion units and a configuration in which the luminance pixel and the event pixel share one photoelectric conversion unit can be considered. In the following description, the configuration in which the luminance pixel and the event pixel respectively include the separate photoelectric conversion units is referred to as a pixel separation configuration, and the configuration in which the luminance pixel and the event pixel share one photoelectric conversion unit is referred to as a pixel sharing configuration.

1.2.1 Example of Pixel Separation Configuration

Figure 3:
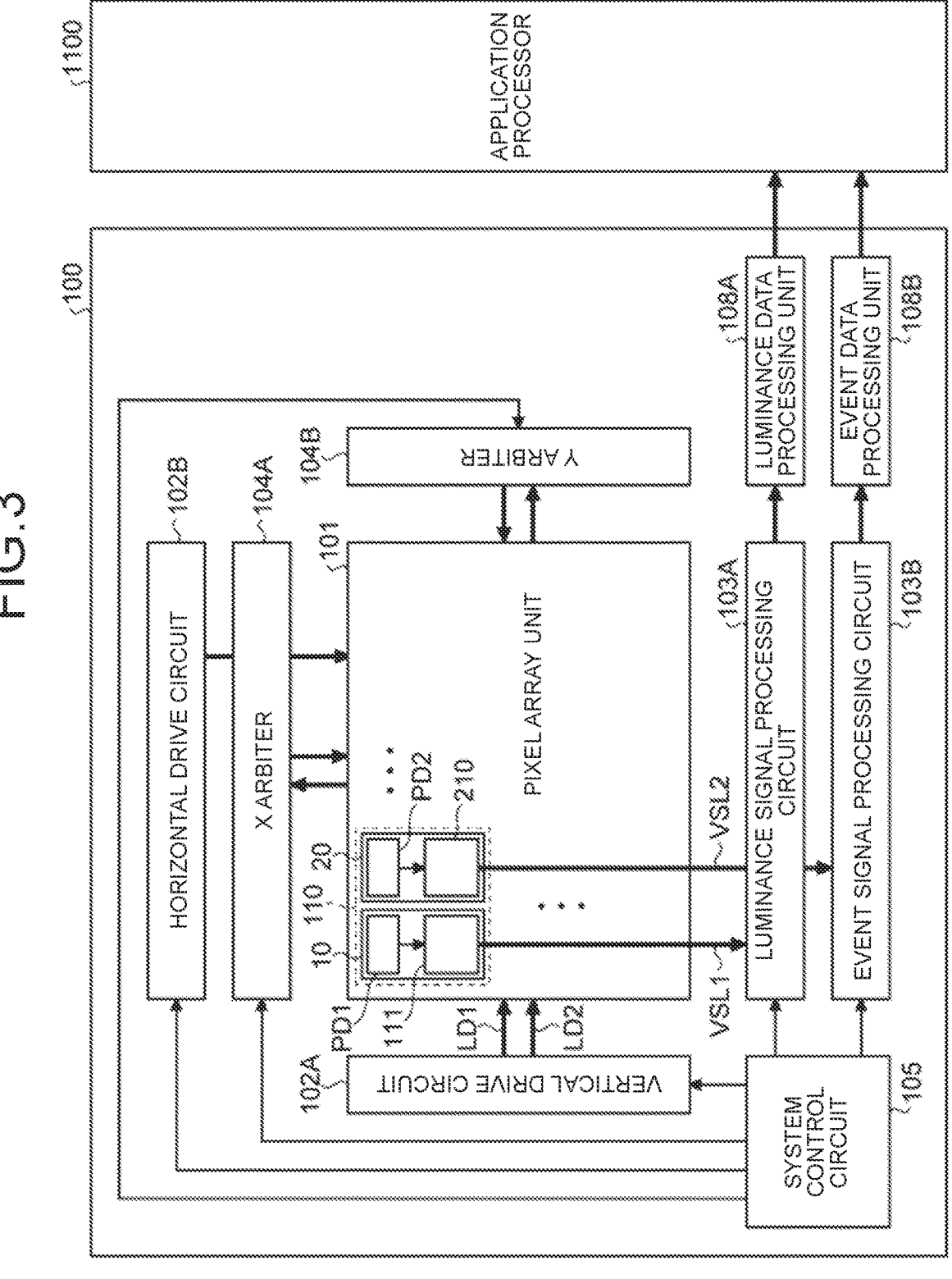
FIG. 3 is a block diagram illustrating a schematic configuration example of the solid-state imaging device according to the embodiment of the present disclosure, and illustrating an example of a pixel separation configuration.

FIG. 3 is a schematic configuration example of the solid-state imaging device according to the present embodiment, and is a block diagram illustrating an example of a pixel separation configuration. As illustrated in FIG. 3, the solid-state imaging device 100 according to the present embodiment includes, for example, a pixel array unit 101, a vertical drive circuit 102A, a horizontal drive circuit 102B, an X arbiter 104A, a Y arbiter 104B, a luminance signal processing circuit 103A, an event signal processing circuit 103B, a system control circuit 105, a luminance data processing unit 108A, and an event data processing unit 108B.

The pixel array unit 101 has a configuration in which unit pixels 110, each of which is a unit of repetition in a pixel layout, are arranged in a row direction and a column direction, that is, in a two-dimensional lattice pattern (also referred to as a matrix pattern). Here, the row direction (also referred to as a row direction) refers to an arrangement direction of pixels in a pixel row (lateral direction in drawings), and the column direction (also referred to as a column direction) refers to an arrangement direction of pixels in a pixel column (longitudinal direction in drawings). It is noted that the unit of repetition here is different from a unit of repetition in a color filter array such as a Bayer array or a quad-Bayer array, and may be a configuration unit repeated in element design.

Each unit pixel 110 includes one or more luminance pixels 10 and one or more event pixels 20. In the present description, the luminance pixel 10 and the event pixel 20 may be simply referred to as pixels, respectively. Although details of a specific circuit configuration and pixel structure of the unit pixel 110 will be described later, in the pixel separation configuration, the luminance pixel 10 and the event pixel 20 each include an individual photoelectric conversion unit. Specifically, the luminance pixel 10 includes a photoelectric conversion unit PD1 that generates and accumulates a charge according to the luminance of the incident light, and generates a luminance signal of a voltage according to the luminance. Meanwhile, the event pixel 20 includes a photoelectric conversion unit PD2 that generates a charge according to the luminance of the incident light, and in a case where a luminance change of the incident light is detected on the basis of a photocurrent flowing from the photoelectric conversion unit PD2, outputs a request for requesting reading from itself, and outputs event data indicating that an event has been detected according to arbitration by an arbiter that inputs this request.

In the pixel array unit 101, pixel drive lines LD1 and LD2 are wired in the row direction for each pixel row, and vertical signal lines VSL1 and VSL2 are wired in the column direction for each pixel column with respect to the matrixshaped pixel array. For example, the pixel drive line LD1 is connected to the luminance pixel 10 of each row, and the pixel drive line LD2 is connected to the event pixel 20 of each row. Meanwhile, for example, the vertical signal line VSL1 is connected to the luminance pixel 10 of each column, and the vertical signal line VSL2 is connected to the event pixel 20 of each column. However, the present disclosure is not limited thereto, and the pixel drive lines LD1 and LD2 may be wired so as to be orthogonal to each other. Similarly, the vertical signal lines VSL1 and VSL2 may be wired so as to be orthogonal to each other. For example, the pixel drive line LD1 may be wired in the row direction, the pixel drive line LD2 may be wired in the column direction, the vertical signal line VSL1 may be wired in the column direction, and the vertical signal line VSL2 may be wired in the row direction.

The pixel drive line LD1 transmits a control signal for performing driving when reading a luminance signal from the luminance pixel 10. The pixel drive line LD2 transmits a control signal for bringing the event pixel 20 into an active state in which an event can be detected. In FIG. 3, each of the pixel drive lines LD1 and LD2 is illustrated as one wiring, but the number thereof is not limited to one. One end of each of the pixel drive line LD1 and the pixel drive line LD2 is connected to an output end corresponding to each row of the vertical drive circuit 102A.

(Drive Configuration of Luminance Pixel)

Each luminance pixel 10 includes the photoelectric conversion unit PD1 that photoelectrically converts incident light to generate a charge, and a pixel circuit 111 that generates a luminance signal of a voltage value corresponding to a charge amount of the charge generated in the photoelectric conversion unit PD1, and causes the luminance signal to appear in the vertical signal line VSL1 under the control of the vertical drive circuit 102A.

The vertical drive circuit 102A includes a shift register, an address decoder, and the like, and drives the luminance pixels 10 of the pixel array unit 101 at the same time for all pixels or on a row-by-row basis. That is, the vertical drive circuit 102A forms a drive unit that controls the operation of each luminance pixel 10 of the pixel array unit 101 together with the system control circuit 105 that controls the vertical drive circuit 102A. Although a specific configuration of the vertical drive circuit 102A is not illustrated, the vertical drive circuit generally includes two scanning systems of a read scanning system and a sweep scanning system.

The read scanning system sequentially selects and scans each pixel of the pixel array unit 101 on a row-by-row basis in order to read out a signal from each pixel. The luminance signal read from each pixel is an analog signal. The sweep scanning system performs sweep scanning on a read row on which read scanning is performed by the read scanning system prior to the read scanning by an exposure time.

By the sweep scanning by the sweep scanning system, unnecessary charges are swept out from the photoelectric conversion unit PD1 of each luminance pixel 10 in the read row, whereby the photoelectric conversion unit PD1 is reset. Then, by sweeping out (resetting) the unnecessary charges in the sweep scanning system, a so-called electronic shutter operation is performed. Here, the electronic shutter operation refers to an operation of discarding the charge of the photoelectric conversion unit PD1 and newly starting exposure (starting accumulation of charges).

The signal read by the read operation by the read scanning system corresponds to the amount of light received after the immediately preceding read operation or electronic shutter operation. Then, a period from the read timing by the immediately preceding read operation or the sweep timing by the electronic shutter operation to the read timing by the current read operation is a charge accumulation period (also referred to as an exposure period) in each pixel.

The luminance signal output from each luminance pixel 10 of the pixel row selectively scanned by the vertical drive circuit 102A is input to the luminance signal processing circuit 103A through each of the vertical signal lines VSL1 for each pixel column. The luminance signal processing circuit 103A performs predetermined signal processing on the luminance signal output from each luminance pixel 10 of the selected row through the vertical signal line VSL1 for each pixel column of the pixel array unit 101, and temporarily stores the luminance signal after the signal processing.

Specifically, the luminance signal processing circuit 103A performs at least noise removal processing, for example, correlated double sampling (CDS) processing or double data sampling (DDS) processing, as the signal processing. For example, fixed pattern noise unique to the pixel such as a reset noise and a threshold variation of an amplification transistor in the pixel is removed by the CDS processing. The luminance signal processing circuit 103A also has, for example, an analog-to-digital (AD) conversion function, and converts an analog luminance signal read from the photoelectric conversion unit PD1 into a digital signal and outputs the digital signal.

The horizontal drive circuit 102B includes a shift register, an address decoder, and the like, and sequentially selects the pixel circuits 111 corresponding to the pixel columns of the luminance signal processing circuit 103A. By the selective scanning by the horizontal drive circuit 102B, luminance signals subjected to signal processing for each pixel circuit 111 in the luminance signal processing circuit 103A are sequentially output.

(Drive Configuration of Event Pixel)

Each event pixel 20 includes the photoelectric conversion unit PD2 that generates a charge according to the luminance of the incident light, and an address event detection circuit 210 that detects the presence or absence of an event on the basis of a change in the current value of the photocurrent flowing out of the photoelectric conversion unit PD2, and detects the presence or absence of an event on the basis of whether or not a change exceeding a predetermined threshold value has occurred in the photocurrent according to the luminance of the incident light. For example, each event pixel 20 detects that the luminance change exceeds or falls below a predetermined threshold value as an event.

When detecting an event, the event pixel 20 outputs a request for requesting permission to output event data indicating the occurrence of the event to each of the X arbiter 104A and the Y arbiter 104B. Then, in a case where the event pixel 20 receives a response indicating the permission to output the event data from each of the X arbiter 104A and the Y arbiter 104B, the event pixel 20 outputs the event data to the event signal processing circuit 103B.

The event signal processing circuit 103B performs predetermined signal processing on the event data input from the event pixel 20, and outputs the event data after the signal processing.

As described above, the change in the photocurrent generated in the event pixel 20 can also be regarded as a light amount change (luminance change) of the light incident on the photoelectric conversion unit PD2 of the event pixel 20. Therefore, it can also be said that the event is a light amount change (luminance change) of the event pixel 20 exceeding a predetermined threshold value. The event data indicating the occurrence of the event includes at least position information such as coordinates indicating the position of the event pixel 20 where the light amount change as the event has occurred. The event data can include the polarity of the light amount change in addition to the position information.

For a series of event data output at a timing when an event occurs from the event pixel 20, as long as an interval between pieces of event data is maintained as it is at the time of event occurrence, it can be said that the event data implicitly includes time information indicating a relative time when the event occurs.

However, when the interval between the pieces of event data is not maintained as it is at the time of event occurrence due to the event data being stored in the memory or the like, the time information implicitly included in the event data is lost. Therefore, before the interval between the pieces of event data is not maintained as it is at the time of event occurrence, the event signal processing circuit 103B may include time information indicating a relative time at which the event such as a time stamp has occurred in the event data.

(Other Configurations)

The system control circuit 105 includes a timing generator that generates various timing signals, and the like, and performs drive control of the vertical drive circuit 102A, the horizontal drive circuit 102B, the X arbiter 104A, the Y arbiter 104B, the luminance signal processing circuit 103A, the event signal processing circuit 103B, and the like on the basis of various timings generated by the timing generator.

Each of the luminance data processing unit 108A and the event data processing unit 108B has at least an arithmetic processing function, and performs various signal processing such as arithmetic processing on the image data (image frame data and event frame data) output from the luminance signal processing circuit 103A or the event signal processing circuit 103B.

For example, the image data output from the luminance data processing unit 108A or the event data processing unit 108B may be subjected to predetermined processing in the application processor 1100 or the like in the information processing apparatus 1 equipped with the solid-state imaging device 100, or the same may be transmitted to the outside via a predetermined network.

It is noted that the solid-state imaging device 100 may include a storage unit configured to temporarily store data necessary for signal processing in the luminance data processing unit 108A and the event data processing unit 108B, data processed by any one or more of the luminance signal processing circuit 103A, the event signal processing circuit 103B, the luminance data processing unit 108A, and the event data processing unit 108B, and the like.

1.2.2 Example of Pixel Sharing Configuration

Figure 4:
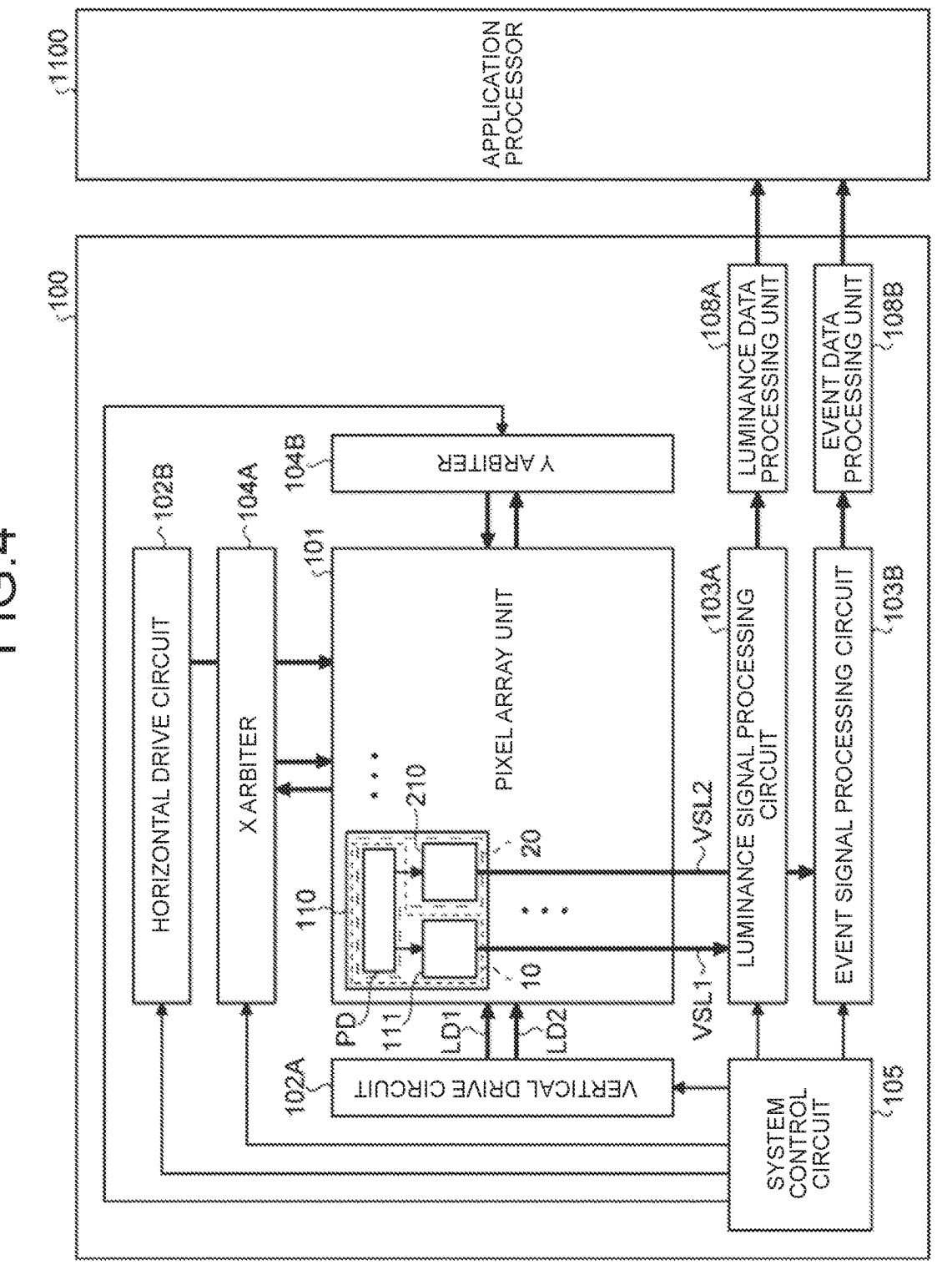
FIG. 4 is a block diagram illustrating another schematic configuration example of the solid-state imaging device according to the embodiment of the present disclosure, and illustrating an example of a pixel sharing configuration.

FIG. 4 is a block diagram illustrating another schematic configuration example of the solid-state imaging device according to the present embodiment and an example of a pixel sharing configuration. As can be seen by comparing FIG. 3 and FIG. 4, in the pixel sharing configuration, one or more luminance pixels 10 and one or more event pixels 20 in the unit pixel 110 share one photoelectric conversion unit PD. In other words, the pixel circuit 111 and the luminance signal processing circuit 103A corresponding to a first signal processing unit configured to acquire the luminance signal and the address event detection circuit 210 and the event signal processing circuit 103B corresponding to a second signal processing unit configured to acquire the event signal are connected to the common photoelectric conversion unit PD. Other configurations and operations may be similar to those of the solid-state imaging device 100 according to the pixel separation configuration described with reference to FIG. 3, and thus, detailed description thereof is omitted here.

1.3 Stacked Structure Example of Solid-State Imaging Device

Figure 5:
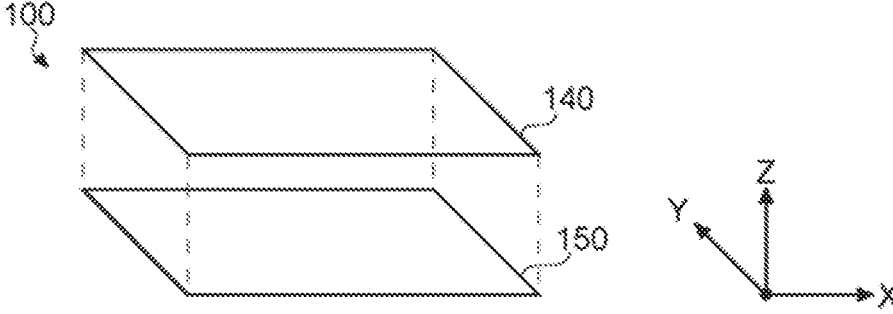
FIG. 5 is a diagram illustrating a stacked structure example of the solid-state imaging device according to the embodiment of the present disclosure.

FIG. 5 is a diagram illustrating a stacked structure example of the solid-state imaging device according to the present embodiment. As illustrated in FIG. 5, the solid-state imaging device 100 has a structure in which a pixel chip 140 and a circuit chip 150 are vertically stacked. The pixel chip 140 is, for example, a semiconductor chip including a photoelectric conversion unit of each of the luminance pixel 10 and the event pixel 20 and a part of a circuit configuration in the luminance pixel 10 and the event pixel 20, and the circuit chip 150 is a semiconductor chip including a configuration other than the configuration arranged in the pixel chip 140.

In order to bond the pixel chip 140 to the circuit chip 150, for example, so-called direct bonding can be used, in which respective bonding surfaces are flattened and the bonding surfaces are bonded to each other by an electronic force. However, the present disclosure is not limited thereto, and for example, so-called Cu—Cu bonding in which copper (Cu) electrode pads formed on the bonding surfaces are bonded to each other, bump bonding, and the like can also be used.

Furthermore, the pixel chip 140 and the circuit chip 150 are electrically connected to each other via, for example, a connection portion such as a through contact via (TCV) formed to penetrate the semiconductor substrate. For the connection using the TCV, for example, a so-called twin TCV method in which two TCVs including a TCV provided in the pixel chip 140 and a TCV provided from the pixel chip 140 to the circuit chip 150 are connected on the outer surface of the chip, a so-called shared TCV method in which both the pixel chip 140 and the circuit chip 150 are connected to each other by a TCV formed to penetrate from the pixel chip 140 to the circuit chip 150, or the like can be adopted.

However, when the Cu—Cu bonding or the bump bonding is used to bond the pixel chip 140 to the circuit chip 150, the pixel chip 140 and the circuit chip 150 may be electrically connected to each other via a Cu—Cu bonding portion or a bump bonding portion.

1.4 Circuit Configuration Example of Unit Pixel

Next, a circuit configuration example of the unit pixel 110 according to each of the case of the pixel separation configuration and the case of the pixel sharing configuration will be described.

1.4.1 Case of Pixel Separation Configuration

Figure 6:
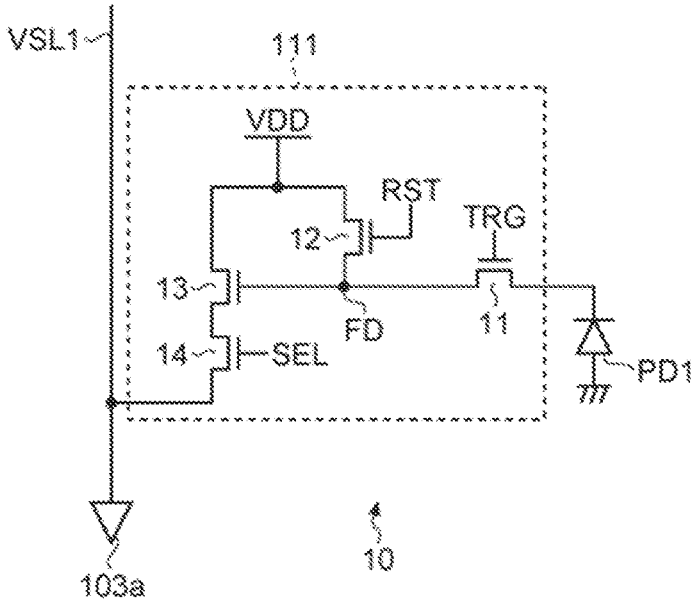
FIG. 6 is a circuit diagram illustrating a schematic configuration example of a luminance pixel in the pixel separation configuration according to the embodiment of the present disclosure.
Figure 7:
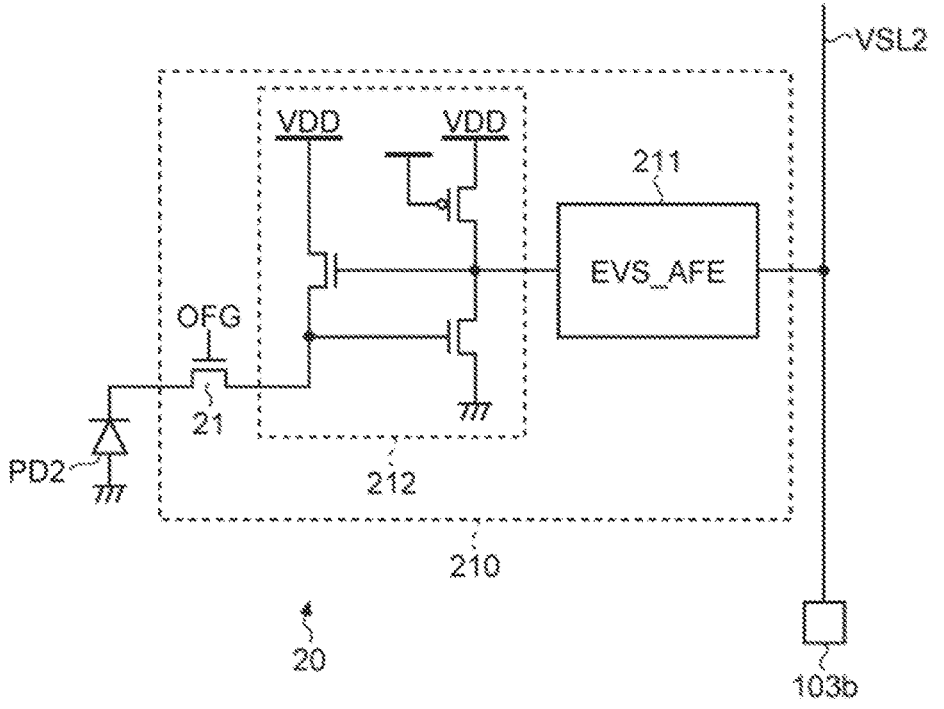
FIG. 7 is a circuit diagram illustrating a schematic configuration example of an event pixel in the pixel separation configuration according to the embodiment of the present disclosure.

First, a circuit configuration example of the luminance pixel 10 and the event pixel 20 in the case of the pixel separation configuration will be described. FIG. 6 is a circuit diagram illustrating a schematic configuration example of a luminance pixel in the pixel separation configuration according to the present embodiment. FIG. 7 is a circuit diagram illustrating a schematic configuration example of an event pixel in the pixel separation configuration according to the present embodiment.

1.4.1.1 Luminance Pixel

As illustrated in FIG. 6, the luminance pixel 10 includes, for example, the photoelectric conversion unit PD1 and the pixel circuit 111. The pixel circuit 111 includes a transfer transistor 11, a floating diffusion region FD, a reset transistor 12, an amplification transistor 13, and a selection transistor 14.

In the luminance pixel 10, for example, the photoelectric conversion unit PD1 and the transfer transistor 11 may be arranged on the pixel chip 140. Meanwhile, the reset transistor 12, the amplification transistor 13, and the selection transistor 14 may be arranged on the pixel chip 140 or may be arranged on the circuit chip 150.

A selection control line included in the pixel drive line LD1 is connected to the gate of the selection transistor 14, a reset control line included in the pixel drive line LD1 is connected to the gate of the reset transistor 12, and a transfer control line included in the pixel drive line LD1 is connected to the gate of the transfer transistor 11. Furthermore, the vertical signal line VSL1 having one end connected to the luminance signal processing circuit 103A is connected to the drain of the amplification transistor 13 via the selection transistor 14.

For example, the photoelectric conversion unit PD1 photoelectrically converts incident light, thereby generating a charge corresponding to the light amount (luminance) of the incident light. The transfer transistor 11 transfers the charge generated in the photoelectric conversion unit PD1. The floating diffusion region FD accumulates the charge transferred by the transfer transistor 11. The amplification transistor 13 causes a luminance signal of a voltage value corresponding to the charges accumulated in the floating diffusion region FD to appear in the vertical signal line VSL1. The reset transistor 12 releases the charges accumulated in the floating diffusion region FD. The selection transistor 14 selects the luminance pixel 10 to be read.

The anode of the photoelectric conversion unit PD1 is grounded, and the cathode thereof is connected to the transfer transistor 11. The charges flowing out via the transfer transistor 11 are accumulated in the floating diffusion region FD configured by a wiring structure connecting the source of the reset transistor 12 to the gate of the amplification transistor 13. It is noted that the drain of the reset transistor 12 may be connected to, for example, a power supply line to which a power supply voltage VDD or a reset voltage lower than the power supply voltage VDD is supplied.

The source of the amplification transistor 13 may be connected to the power supply line via, for example, a constant current circuit (not illustrated) or the like. The drain of the amplification transistor 13 is connected to the source of the selection transistor 14, and the drain of the selection transistor 14 is connected to the vertical signal line VSL1.

The floating diffusion region FD converts the accumulated charges into a voltage having a voltage value corresponding to the amount of charge. It is noted that the floating diffusion region FD may be, for example, a capacitance-to-ground. However, the floating diffusion region FD is not limited thereto, and the same may be a capacitance or the like added by intentionally connecting a capacitor or the like to a node where the drain of the transfer transistor 11, the source of the reset transistor 12, and the gate of the amplification transistor 13 are connected.

The vertical signal line VSL1 is connected to an analog-to-digital (AD) conversion circuit 103a provided for each column (that is, for each vertical signal line VSL1) in the luminance signal processing circuit 103A. The AD conversion circuit 103a includes, for example, a comparator and a counter, and converts an analog luminance signal into a digital luminance signal by comparing a reference voltage such as a single slope or a ramp shape input from an external reference voltage generation circuit (digital-to-analog converter (DAC)) with the luminance signal appearing in the vertical signal line VSL1. It is noted that the AD conversion circuit 103a may include, for example, a correlated double sampling (CDS) circuit and the like, and may be configured to be able to reduce kTC noise and the like.

1.4.1.2 Event Pixel

As illustrated in FIG. 7, the event pixel 20 includes, for example, the photoelectric conversion unit PD2 and the address event detection circuit 210. The address event detection circuit 210 includes a discharge transistor 21, a light receiving circuit 212, and a logic circuit 211.

In the event pixel 20, for example, the photoelectric conversion unit PD and the discharge transistor 21 may be arranged in the pixel chip 140. Meanwhile, a part or all of the light receiving circuit 212 and the logic circuit 211 may be disposed on the circuit chip 150.

The discharge transistor 21 causes the photocurrent flowing out of the photoelectric conversion unit PD to flow into the light receiving circuit 212.

As will be described in detail later, the address event detection circuit 210 detects the presence or absence of an event on the basis of a change in the photocurrent flowing out of the photoelectric conversion unit PD, and outputs a request for requesting permission to output event data indicating event occurrence to each of the X arbiter 104A and the Y arbiter 104B when detecting the event. Then, the address event detection circuit 210 outputs the event data to the vertical drive circuit 102A and the event signal processing circuit 103B when receiving a response indicating the permission to output the event data from each of the X arbiter 104A and the Y arbiter 104B. At that time, the address event detection circuit 210 may include time information indicating a relative time at which an event such as a time stamp has occurred in the event data.

The vertical signal line VSL2 is connected to, for example, a signal processing circuit 103b provided for each column (that is, for each vertical signal line VSL2) in the event signal processing circuit 103B.

1.4.1.2.1 Configuration Example of Address Event Detection Circuit

Next, a configuration example of the address event detection circuit 210 in the event pixel 20 will be described. The event pixel 20 detects whether or not an event has occurred on the basis of whether or not a change amount of a photocurrent exceeds a predetermined threshold value. The event includes, for example, an ON event indicating that the change amount of the photocurrent exceeds an upper limit threshold value and an OFF event indicating that the change amount falls below a lower limit threshold value. Furthermore, event data (event information) indicating occurrence of an event includes, for example, one bit indicating a detection result of the ON event and one bit indicating a detection result of the OFF event. It is noted that the event pixel 20 can be configured to have a function of detecting only the ON event, or can be configured to have a function of detecting only the OFF event.

Figure 8:
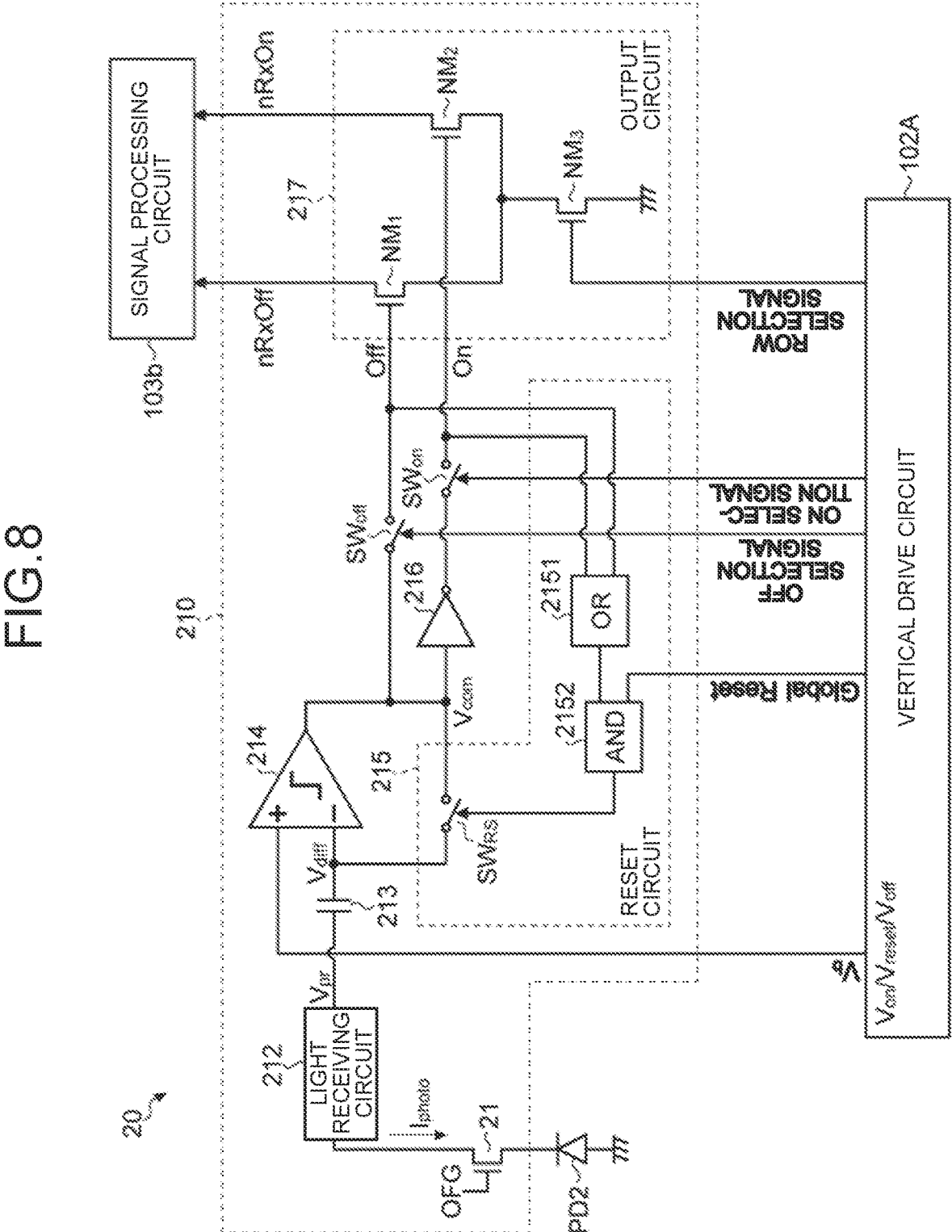
FIG. 8 is a circuit diagram illustrating a schematic configuration example of an address event detection circuit according to the embodiment of the present disclosure.

FIG. 8 is a circuit diagram illustrating a schematic configuration example of the address event detection circuit according to the present embodiment. It is noted that FIG. 8 illustrates a configuration example in a case where one comparator performs detection of an ON event and detection of an OFF event in a time division manner.

As illustrated in FIG. 8, the address event detection circuit 210 includes the discharge transistor 21, the light receiving circuit 212, a memory capacity 213, a comparator 214, a reset circuit 215, an inverter 216, and an output circuit 217.

A selection control line included in the pixel drive line LD2 is connected to the gate of the discharge transistor 21. In a case where the event pixel 20 is activated, a selection signal is applied from the vertical drive circuit 102A to the gate of the discharge transistor 21 via the selection control line, whereby the discharge transistor 21 is turned on.

However, in a case where the event pixel 20 may be always in the ON state, the discharge transistor 21 may be omitted.

Figure 9:
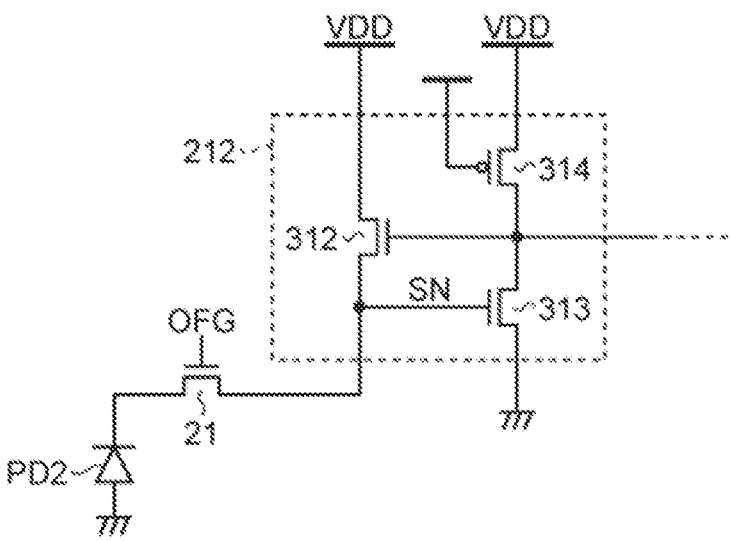
FIG. 9 is a circuit diagram illustrating a basic configuration example of a light receiving circuit according to the embodiment of the present disclosure.
Figure 10:
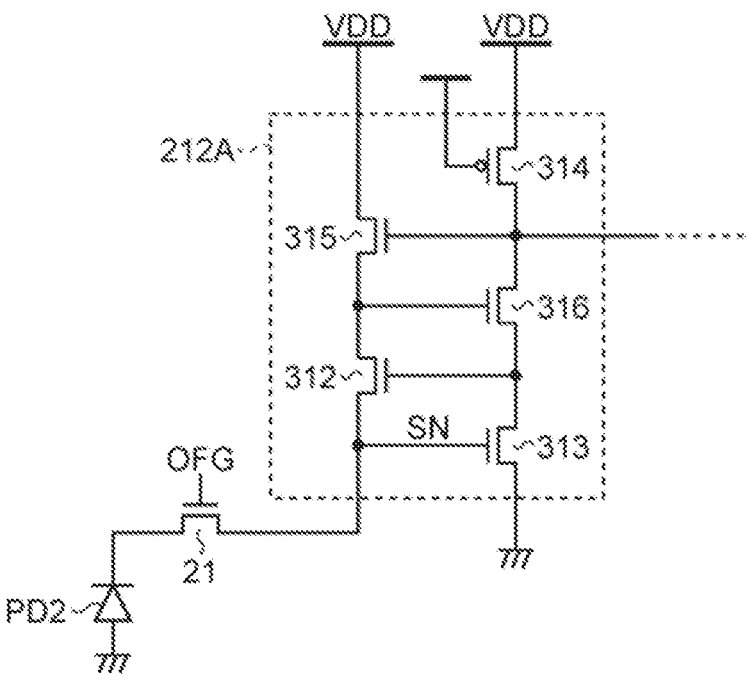
FIG. 10 is a circuit diagram illustrating a basic configuration example of a light receiving circuit according to a modification of the embodiment of the present disclosure.

Although details will be described later, the light receiving circuit 212 includes, for example, a current-voltage conversion circuit as illustrated in FIG. 9 or 10, and converts a photocurrent $I_{photo}$ flowing out of the photoelectric conversion unit PD2 into a voltage $V_{pr}$. Here, a relationship of the voltage $V_{pz}$ with respect to the intensity (luminance) of light is usually a logarithmic relationship. That is, the light receiving circuit 212 converts the photocurrent $I_{photo}$ corresponding to the intensity of light emitted to the light receiving surface of the photoelectric conversion unit PD2 into the voltage $V_{pr}$ that is a logarithmic function. However, a relationship between the photocurrent $I_{photo}$ and the voltage $V_{pr}$ is not limited to the logarithmic relationship.

The voltage $V_{pr}$ according to the photocurrent $I_{photo}$ output from the light receiving circuit 212 passes through the memory capacity 213 and then becomes an inversion (−) input, which is a first input of the comparator 214 as a voltage $V_{diff}$. The comparator 214 is usually configured by a differential pair transistor. The comparator 214 uses a threshold voltage $V_b$ provided from the vertical drive circuit 102A as a non-inversion (+) input, which is a second input, and performs detection of the ON event and detection of the OFF event in a time division manner. Furthermore, after the detection of the ON event/OFF event, the reset circuit 215 resets the event pixel 20.

The vertical drive circuit 102A outputs a voltage $V_{on}$ as the threshold voltage $V_b$ in a time division manner at a stage of detecting the ON event, outputs a voltage $V_{off}$ at a stage of detecting the OFF event, and outputs a voltage $V_{reset}$ at a stage of reset. The voltage $V_{reset}$ is set to a value between the voltage $V_{on}$ and the voltage $V_{off}$, preferably an intermediate value between the voltage $V_{on}$ and the voltage $V_{off}$. Here, the "intermediate value" means to include not only a case where the value is strictly an intermediate value but also a case where the value is substantially an intermediate value, and existence of various variations caused by design or manufacturing is allowed.

Furthermore, the vertical drive circuit 102A outputs an ON selection signal to the event pixel 20 at a stage of detecting the ON event, outputs an OFF selection signal at a stage of detecting the OFF event, and outputs a global reset signal (Global Reset) at a stage of performing reset. The ON selection signal is provided as a control signal to a selection switch $SW_{on}$ provided between the inverter 216 and the output circuit 217. The OFF selection signal is provided as a control signal to a selection switch $SW_{off}$ provided between the comparator 214 and the output circuit 217.

In the stage of detecting the ON event, the comparator 214 compares the voltage $V_{on}$ with the voltage $V_{diff}$ and when the voltage $V_{diff}$ exceeds the voltage $V_{on}$, the comparator 214 outputs ON event information On indicating that the change amount of the photocurrent $I_{photo}$ exceeds an upper limit threshold value as a comparison result. The ON event information On is inverted by the inverter 216 and then supplied to the output circuit 217 through the selection switch $SW_{on}$.

In the stage of detecting the OFF event, the comparator 214 compares the voltage $V_{off}$ with the voltage $V_{diff}$ and when the voltage $V_{diff}$ becomes lower than the voltage $V_{off}$, the comparator 214 outputs OFF event information Off indicating that the change amount of the photocurrent $I_{photo}$ becomes lower than a lower limit threshold value as a comparison result. The OFF event information Off is supplied to the output circuit 217 through the selection switch $SW_{off}$.

The reset circuit 215 includes a reset switch $SW_{RS}$, two-inputs OR circuit 2151, and two-inputs AND circuit 2152. The reset switch $SW_{RS}$ is connected between an inversion (−) input terminal and an output terminal of the comparator 214, and becomes ON state (closed) to selectively short-circuit between the inversion input terminal and the output terminal.

The OR circuit 2151 receives two inputs of the ON event information On via the selection switch $SW_{on}$ and the OFF event information Off via the selection switch $SW_{off}$. The AND circuit 2152 uses the output signal of the OR circuit 2151 as one input, uses the global reset signal provided from the vertical drive circuit 102A as the other input, and turns on (closes) the reset switch $SW_{RS}$ when either the ON event information On or the OFF event information Off is detected and the global reset signal is in the active state.

As described above, when the output signal of the AND circuit 2152 enters the active state, the reset switch $SW_{RS}$ short-circuits between the inversion input terminal and the output terminal of the comparator 214, and performs global reset on the event pixel 20. As a result, a reset operation is performed only for the event pixel 20 in which the event has been detected.

The output circuit 217 includes an OFF event output transistor $NM_1$, an ON event output transistor $NM_2$, and a current source transistor $NM_3$. The OFF event output transistor $NM_1$ has a memory (not illustrated) for storing the OFF event information Off at a gate part thereof. This memory is formed of the gate parasitic capacitance of the OFF event output transistor $NM_1$.

Similarly to the OFF event output transistor $NM_1$, the ON event output transistor $NM_2$ has a memory (not illustrated) for storing the ON event information On at a gate part thereof. This memory is formed of the gate parasitic capacitance of the ON event output transistor $NM_2$.

In the reading stage, the OFF event information Off stored in the memory of the OFF event output transistor $NM_1$ and the ON event information On stored in the memory of the ON event output transistor $NM_2$ are transferred to the signal processing circuit 103b through an output line nRxOff and an output line nRxOn, which are the vertical signal lines VSL2, for each pixel row of the pixel array unit 101 by allowing a row selection signal to be provided from the vertical drive circuit 102A to the gate electrode of the current source transistor $NM_3$. The signal processing circuit 103b is, for example, a circuit provided in the event signal processing circuit 103B (refer to FIG. 3).

As described above, the event pixel 20 according to the circuit configuration example has an event detection function of performing detection of the ON event and detection of the OFF event in a time division manner under the control of the vertical drive circuit 102A using one comparator 214.

1.4.1.2.2 Configuration Example of Light

Receiving Circuit FIG. 9 is a circuit diagram illustrating a basic configuration example of the light receiving circuit according to the present embodiment. As illustrated in FIG. 9, the light receiving circuit 212 includes n-channel metal oxide semiconductor (nMOS) transistors 312 and 313 and a p-channel MOS (pMOS) transistor 314. Among these transistors, the two nMOS transistors 312 and 313 form, for example, a logarithmic conversion circuit that converts the photocurrent flowing out of the photoelectric conversion unit PD into a voltage signal corresponding to a logarithmic value thereof. The wiring connected to the gate of the nMOS transistor 313 and the wiring into which the photocurrent from the photoelectric conversion unit PD flows function as a sense node SN when an event is detected. The nMOS transistor 313 can correspond to, for example, a second transistor in the claims, and the nMOS transistor 312 can correspond to, for example, a third transistor in the claims.

Furthermore, the pMOS transistor 314 operates as a load MOS transistor for the logarithmic conversion circuit including the two nMOS transistors 312 and 313. It is noted that the photoelectric conversion unit PD and the nMOS transistors 312 and 313 may be disposed, for example, in the pixel chip 140, and the pMOS transistor 314 may be disposed in the circuit chip 150.

The source of the nMOS transistor 312 is connected to the cathode of the photoelectric conversion unit PD, and the drain thereof is connected to a power supply terminal. The pMOS transistor 314 and the nMOS transistor 313 are connected in series between the power supply terminal and the ground terminal. Furthermore, a connection point of the pMOS transistor 314 and the nMOS transistor 313 is connected to the gate of the nMOS transistor 312 and the input terminal of the logic circuit 211, and functions as an output node that outputs a voltage signal VPR to the logic circuit 211. Furthermore, a predetermined bias voltage Vbias1 is applied to the gate of the pMOS transistor 314.

The drains of the nMOS transistors 312 and 313 are connected to the power supply side, and such a circuit is referred to as a source follower. The photocurrent from the photoelectric conversion unit PD is converted into the voltage signal VPR corresponding to the logarithmic value by the two source followers connected in the loop shape. Furthermore, the pMOS transistor 314 supplies a constant current to the nMOS transistor 313.

It is noted that the ground of the pixel chip 140 and the ground of the circuit chip 150 may be separated from each other for countermeasures against interference.

1.4.1.2.3 Modification of Light Receiving Circuit

In FIG. 9, the source follower type light receiving circuit 212 has been described, but the present disclosure is not limited to such a configuration. FIG. 10 is a circuit diagram illustrating a basic configuration example of a light receiving circuit according to a modification of the present embodiment. As illustrated in FIG. 10, a light receiving circuit 212A according to the modification includes, for example, a so-called gain boost type circuit configuration in which an nMOS transistor 315 connected in series between the nMOS transistor 312 and the power supply line and an nMOS transistor 316 connected in series between the nMOS transistor 313 and the pMOS transistor 314 are added to the source follower type light receiving circuit 212 illustrated in FIG. 9. The four nMOS transistors 312, 313, 315, and 316 form, for example, a logarithmic conversion circuit that converts the photocurrent flowing out of the photoelectric conversion unit PD into the voltage signal VPR according to the logarithmic value thereof.

As described above, even in a case where the gain boost type light receiving circuit 212A is used, it is possible to convert the photocurrent from the photoelectric conversion unit PD into the voltage signal VPR having a logarithmic value corresponding to the charge amount.

1.4.2 Case of Pixel Sharing Configuration

Figure 11:
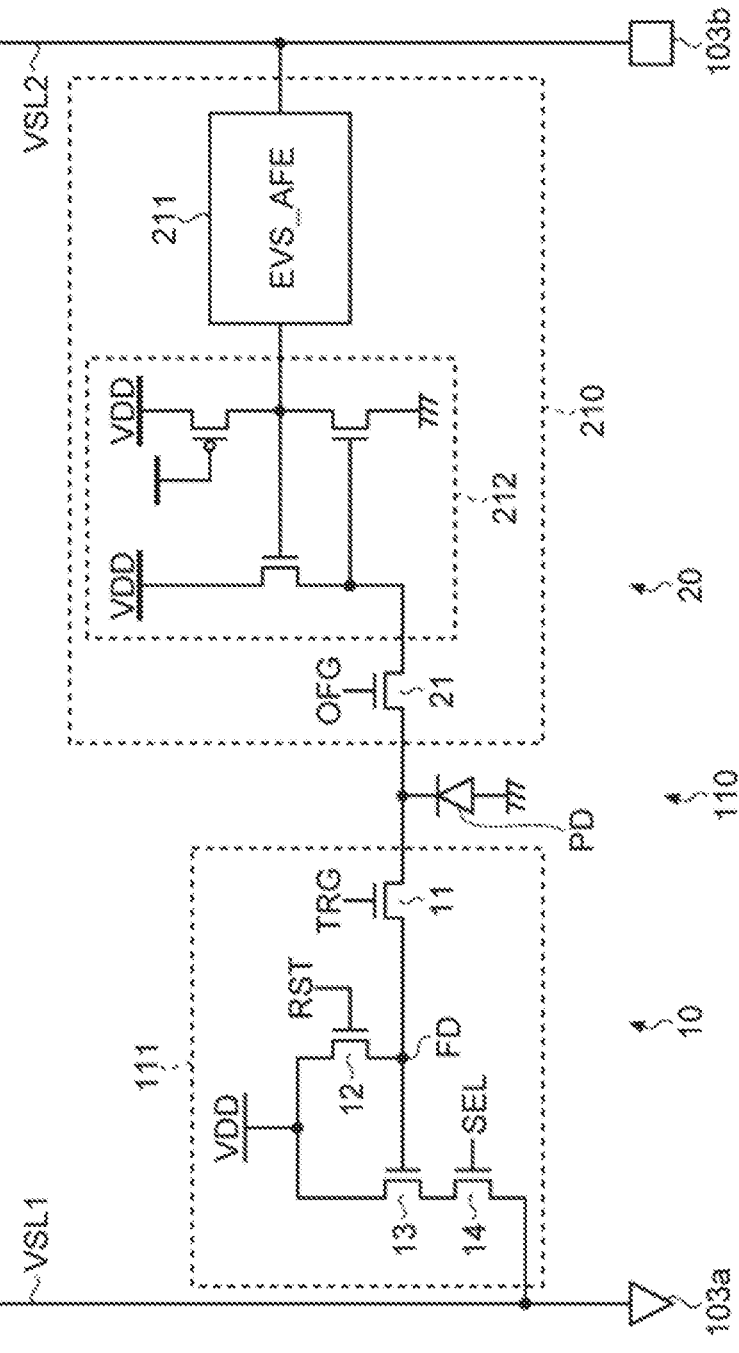
FIG. 11 is a circuit diagram illustrating a schematic configuration example of a luminance pixel and an event pixel in the pixel sharing configuration according to the embodiment of the present disclosure.

Next, a circuit configuration example of the luminance pixel 10 and the event pixel 20 in the case of the pixel sharing configuration will be described. FIG. 11 is a circuit diagram illustrating a schematic configuration example of a luminance pixel and an event pixel in the pixel sharing configuration according to the present embodiment.

As can be seen by comparing FIGS. 6 and 7 with FIG. 11, in the pixel sharing configuration, the luminance pixel 10 and the event pixel 20 share one photoelectric conversion unit PD. That is, both the transfer transistor 11 of the luminance pixel 10 and the discharge transistor 21 of the event pixel 20 are connected to the cathode of the photoelectric conversion unit PD. Other configurations and operations of the luminance pixel 10 and the event pixel 20 may be similar to those of the luminance pixel 10 and the event pixel 20 according to the pixel separation configuration described with reference to FIGS. 6 and 7, and thus, detailed description thereof is omitted here.

1.4.3 Modification Regarding Pixel Sharing

Figure 12:
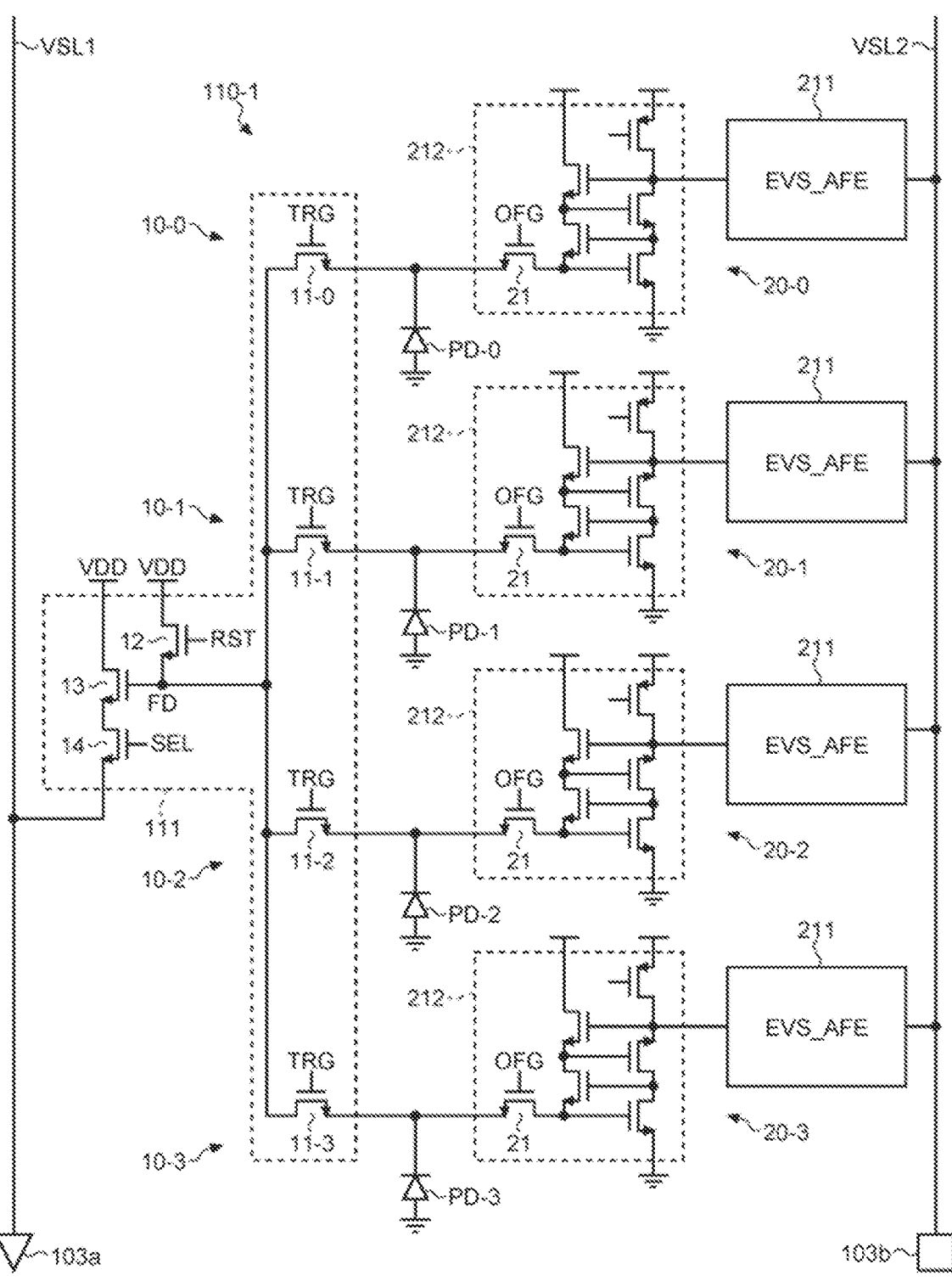
FIG. 12 is a circuit diagram illustrating a schematic configuration example of a luminance pixel and an event pixel in a pixel sharing according to a modification of the embodiment of the present disclosure.

FIG. 12 is a circuit diagram illustrating a schematic configuration example of a luminance pixel and an event pixel in a pixel sharing according to a modification of the present embodiment. As illustrated in FIG. 12, in the modification of the pixel sharing configuration, one unit pixel 110-1 includes a plurality of (four in FIG. 12) luminance pixels 10-0 to 10-3 and a plurality of (four in FIG. 9) event pixels 20-0 to 20-3. For example, the plurality of luminance pixels 10-0 to 10-3 and the plurality of event pixels 20-0 to 20-3 may be arranged in a matrix of M×N (M and N are integers of 1 or more) in the pixel array unit 101.

In such a configuration, the plurality of luminance pixels 10-0 to 10-3 may share a configuration other than transfer transistors 11-0 to 11-3 in the pixel circuit, that is, the reset transistor 12, the amplification transistor 13, the selection transistor 14, and the floating diffusion region FD. As a result, it is possible to have a configuration in which an operation mode in which each of the photoelectric conversion units PD-0 to PD-3 forms each of the luminance pixels 10-0 to 10-3 and an operation mode (for example, high dynamic range: HDR) in which the plurality of photoelectric conversion units PD-O to PD-3 form one luminance pixel 10 can be switched.

1.5 Example of Pixel Array

Next, an arrangement example of the luminance pixel 10 and the event pixel 20 in the pixel array unit 101 will be described. It is noted that, in the following description, a description will be given as to a case in which the pixel array unit 101 includes, as the luminance pixel 10, a luminance pixel 10r that selectively receives light in a wavelength band corresponding to red (R) color, a luminance pixel 10g that selectively receives light in a wavelength band corresponding to green (G) color, and a luminance pixel 10b that selectively receives light in a wavelength band corresponding to blue (B) color in color components forming the RGB three primary colors. Furthermore, in the following description, a case where the base of the array of the luminance pixels 10r, 10g, and 10b is the Bayer array will be exemplified, but the present disclosure is not limited thereto. For example, it is possible to adopt various pixel arrays such as an X-Trans (registered trademark) pixel array in which the repeating unit is 3×3 pixels, a quad Bayer (also referred to as quadra) array of 4-4 pixels, and a white RGB pixel array of 4×4 pixels including luminance pixels having a broad light receiving characteristic with respect to a visible light region in addition to the luminance pixels 10r, 10g, and 10b of each of the three primary colors of RGB.

1.5.1 Case of Pixel Separation Configuration

Figure 13:
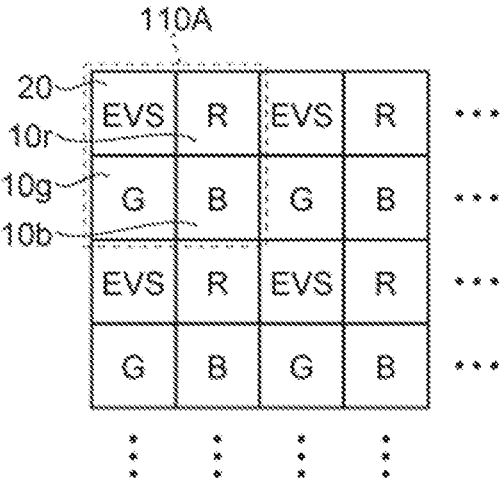
FIG. 13 is a schematic diagram illustrating an example of a pixel array in the pixel separation configuration according to the embodiment of the present disclosure.

FIG. 13 is a schematic diagram illustrating an example of a pixel array in the pixel separation configuration according to the present embodiment. As illustrated in FIG. 13, in the pixel separation configuration, for example, one of the four pixels forming an array pattern 110A which is a repeating unit of the Bayer array is formed by the event pixel 20, and the remaining three are formed by the luminance pixels 10r, 10b, and 10g.

1.5.2 Case of Pixel Sharing Configuration

Figure 14:
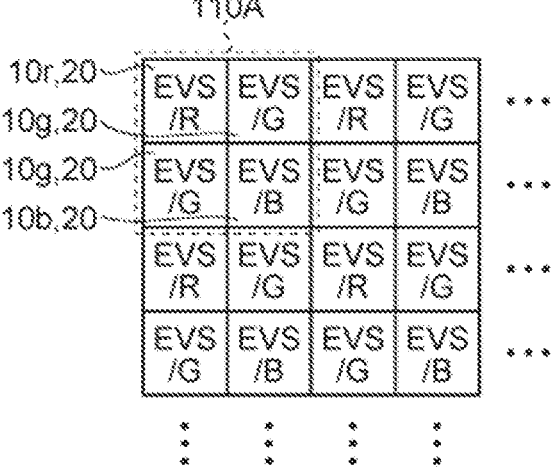
FIG. 14 is a schematic diagram illustrating an example of a pixel array in the pixel sharing configuration according to the embodiment of the present disclosure.

FIG. 14 is a schematic diagram illustrating an example of a pixel array in the pixel sharing configuration according to the present embodiment. As illustrated in FIG. 14, in the pixel sharing configuration, each of the four pixels forming the array pattern 110A, which is a repeating unit of the Bayer array, includes shared pixels that are shared for the luminance pixels 10r, 10g, or 10b and the event pixels 20.

However, in the pixel sharing configuration, it is not necessary that all the pixels are shared pixels of the luminance pixel 10 and the event pixel 20, and some (one or two or more) of the plurality of pixels forming the array pattern 110A may be shared pixels.

As described above, the luminance pixel 10 forming the image sensor and the event pixel 20 forming the EVS are uniformly mixed and arranged in the pixel array unit 101, so that the optical axes of the image sensor and the EVS can match each other or substantially match each other. Accordingly, even in a case where a sensor used in eye tracking, SLAM, or the like is switched between, for example, the image sensor and the EVS, it is possible to omit or simplify processing such as geometric transformation for matching coordinate systems of pieces of image data acquired by respective sensors, thereby making it possible to prevent an increase in processing speed from being suppressed.

Furthermore, by adopting a configuration in which luminance pixel 10 and the event pixel 20 are mixed in the pixel array unit 101, as in a case where the image sensor and the EVS are configured using different chips, it is possible to suppress waste of power due to a sensor that is not used and is always in the ON state, and as such, it is possible to suppress an increase in power consumption.

1.6 Application Example of Information Processing

Apparatus Next, an application example of the information processing apparatus 1 according to the present embodiment will be described. It is noted that, in the following description, an application example of the information processing apparatus 1 for the purpose of eye tracking and an application example of the information processing apparatus 1 for the purpose of SLAM will be described.

1.6.1 Eye Tracking

First, an application example of the information processing apparatus 1 for the purpose of eye tracking will be described.

1.6.1.1 Example of Device

As an application example of the information processing apparatus 1 for the purpose of eye tracking, a description will be given as to a head mounted display (HMD) equipped with an AR function (hereinafter, referred to as an AR device) and an HMD equipped with a VR function (hereinafter, referred to as a VR device). It is noted that, among the reference numerals of each configuration, reference numeral appended with "L" at the end indicates a configuration for the left eye, and reference numeral appended with "R" at the end indicates a configuration for the right eye.

(Example of AR Device)

Figure 15:
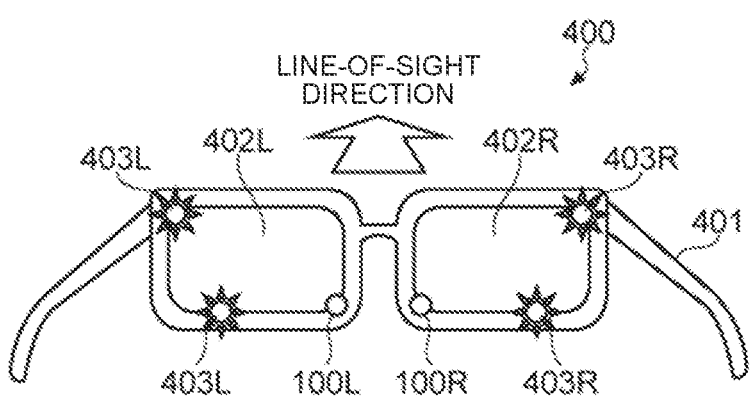
FIG. 15 is a schematic diagram illustrating an example of an AR device according to the embodiment of the present disclosure.

FIG. 15 is a schematic diagram illustrating an example of an AR device according to the present embodiment. As illustrated in FIG. 15, an AR device 400 includes, for example, a frame 401, displays 402L and 402R, light sources 403L and 403R, and solid-state imaging devices 100L and 100R as sensors. The frame 401 may be of various types capable of covering one or both eyes of the user, such as an eyeglass type, a goggle type, or a helmet type.

The displays 402L and 402R attached to the frame 401 are displays that display a video to be superimposed on the real world to a user of the AR device 400. The displays 402L and 402R may be a transmission type or a light shielding type.

That is, the AR device 400 may be an optical see-through type HMD or a video see-through type HMD. However, in the case of the video see-through type, the AR device 400 may be mounted with a camera for photographing the real world in the line-of-sight direction of the user.

In addition, light sources 403L and 403R that illuminate the user's eyes are provided on, for example, the side of the rim facing the user's eyes in the frame 401. The light sources 403L and 403R may correspond to, for example, the light source 1010 in FIG. 1, and one or a plurality of the light sources may be provided for one eye of the user.

Furthermore, for example, on the side of the rim facing the user's eye in the frame 401, the solid-state imaging devices 100L and 100R that image the user's eye are provided. Each of the solid-state imaging device 100L and the solid-state imaging device 100R may have a configuration similar to that of the solid-state imaging device 100 described above.

It is noted that, in the present example, although a description has been given as to the case in which eye tracking is performed on both eyes of the user, the present disclosure is not limited thereto, and the eye tracking may be performed on only one eye.

(Modification of AR Device)

Figure 16:
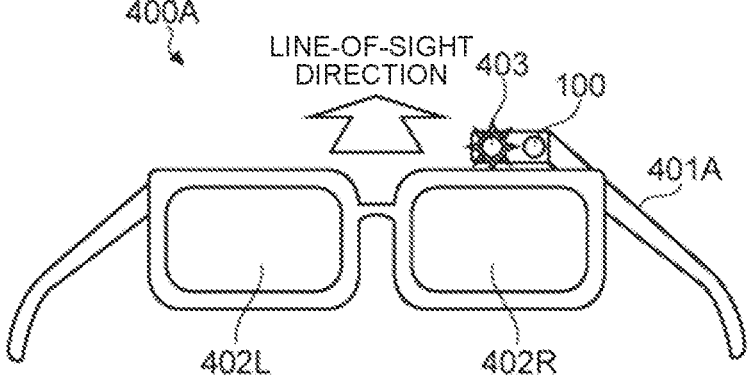
FIG. 16 is a schematic diagram illustrating an AR device according to a modification of the embodiment of the present disclosure.

FIG. 16 is a schematic diagram illustrating an AR device according to a modification of the present embodiment. As illustrated in FIG. 16, an AR device 400A has, for example, a configuration in which one temple of an eye glass type frame 401A is extended in the line-of-sight direction from the rim, and a light source 403 and a solid-state imaging device 100 are provided at a bent tip portion of the extended temple. It is noted that the AR device 400A according to the present modification may be an optical see-through type. Furthermore, the AR device 400A may perform eye tracking on one eye (right eye in FIG. 16) of the user or eye tracking on both eyes of the user.

(Example of VR Device)

Figure 17:
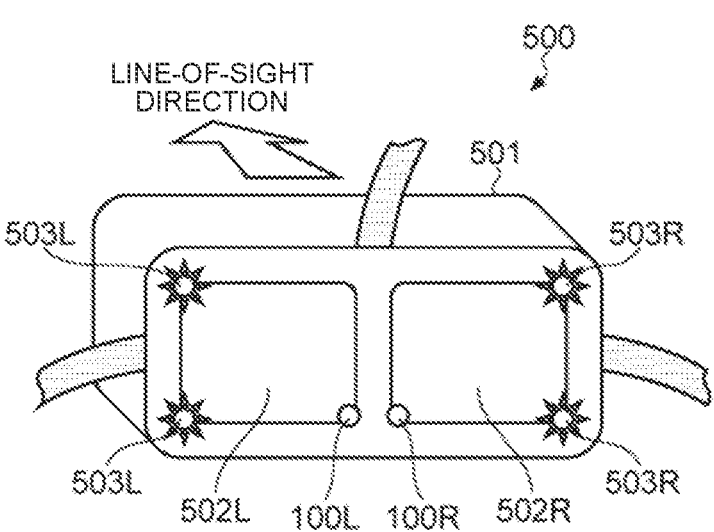
FIG. 17 is a schematic diagram illustrating an example of a VR device according to the embodiment of the present disclosure.

FIG. 17 is a schematic diagram illustrating an example of a VR device according to the present embodiment. As illustrated in FIG. 17, a VR device 500 includes, for example, a frame 501, displays 502L and 502R, light sources 503L and 503R, and solid-state imaging devices 100L and 100R as sensors, similarly to the AR device 400 illustrated in FIG. 15. The frame 501 may be of various types capable of covering one or both eyes of the user, such as an eyeglass type, a goggle type, or a helmet type.

The displays 502L and 502R attached to the frame 501 are displays that display a rendered video of a virtual space to a user of the VR device 500.

In addition, similarly to the AR device 400, a plurality of light sources 503L and 503R that illuminate the user's eyes and the solid-state imaging devices 100L and 100R that image the user's eyes are provided around the displays 502L and 502R on the side of the frame 501 facing the user.

It is noted that, in the present example, although a description has been given as to the case in which eye tracking is performed on both eyes of the user, the present disclosure is not limited thereto, and the eye tracking may be performed on only one eye.

1.6.1.2 Example of System Configuration

Next, a description will be given as to a system configuration example of the above-described AR device 400 or 400A or the VP device 500 (hereinafter, simply referred to as a device). It is noted that the AR device 400 or 400A or the VR device 500 (a device 600 in FIG. 18) may correspond to the information processing apparatus 1 described above.

Figure 18:
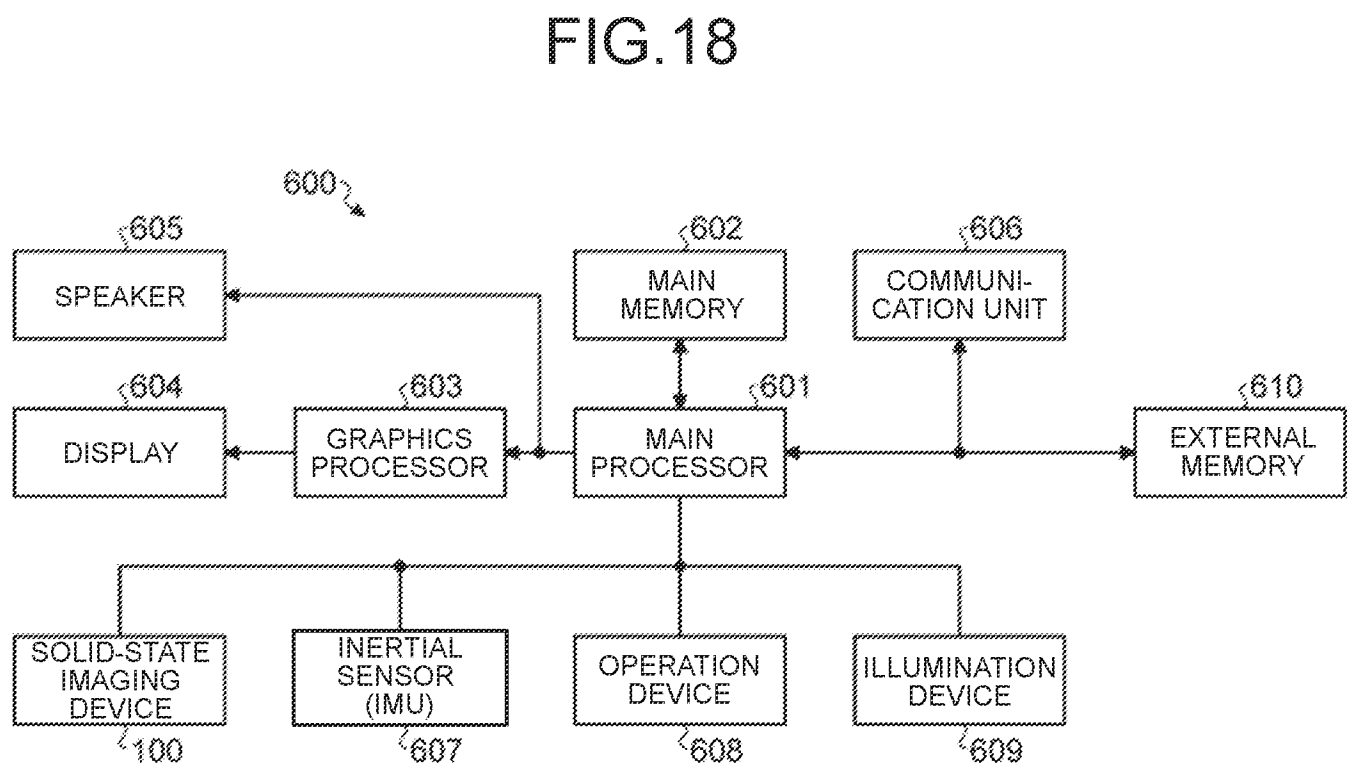

FIG. 18 is a block diagram illustrating a system configuration example of the device according to the present embodiment. As illustrated in FIG. 18, the device 600 includes, for example, a main processor 601, a main memory 602, a graphics processor 603, a display 604, a speaker 605, a communication unit 606, the solid-state imaging device 100, an inertial sensor 607, an operation device 608, an illumination device 609, and an external memory 610.

The main processor 601 includes, for example, a CPU, and can correspond to the application processor 1100 in FIG. 2. The main processor 601 executes various types of processing necessary for control of respective units forming the device 600, an AR function, a VR function, eye tracking, and the like.

The main memory 602 is, for example, a storage area used by the main processor 601, and stores programs and data read from the external memory 610 and data in the middle of execution of the main processor 601 or an execution result.

The graphics processor 603 includes, for example, a graphics processing unit (GPU), and generates a video to be presented to a user via the display 604 on the basis of data and an instruction given from the main processor 601.

The display 604 corresponds to, for example, the displays 402L and 402R in FIG. 15 or 16 or the displays 502L and 502R in FIG. 17, and displays the video data input from the graphics processor 603.

The speaker 605 emits, for example, waveform data input from the main processor 601 as sound to the user. The sound emitted toward the user may include music, guidance, operation sound, warning sound, and the like.

The communication unit 606 may be, for example, a communication module configured to be connected to a mobile communication network such as 4G (fourth generation mobile communication system, 4G long term evolution (LTE), or 5G (fifth generation mobile communication system), or a communication network such as a local area network (LAN) (including Wi-Fi), a wide area network (WAN), or the Internet. However, the communication unit 606 is not limited thereto, and may be a communication unit that directly or indirectly communicates with another device such as infrared communication or Bluetooth (registered trademark).

The inertial sensor 607 may be, for example, an inertial measurement unit (IMU) or the like, and detects an inclination, a direction, or the like of the device 600 mounted on the head of the user. Furthermore, the inertial sensor 607 may detect a displacement amount of the position of the device 600 in the horizontal direction and/or the vertical direction.

The operation device 608 is, for example, a user interface for the user to perform operation input to the device 600. As the operation device 608, various input devices such as an input device such as a button switch or a touch panel, and a voice input device that recognizes voice may be used.

The illumination device 609 corresponds to, for example, the light source 1010 in FIG. 1, and emits light of a predetermined wavelength in response to an instruction from the main processor 601.

The external memory 610 may be, for example, a flash memory, a universal serial bus (USB) memory, a secure digital (SD) memory card, a hard disk drive (HDD), or the like, and stores various programs and data executed by the main processor 601.

1.6.1.3 Example of Eye Tracking Configuration

Figure 19:
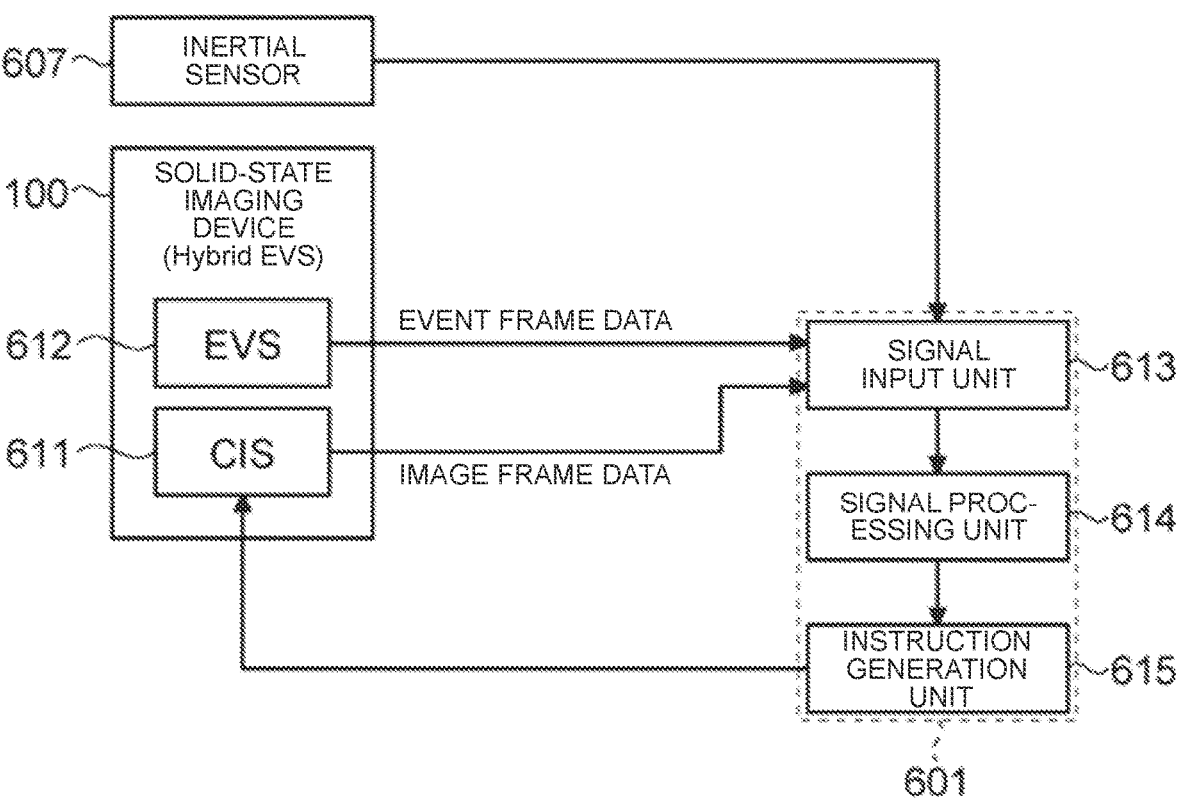
FIG. 19 is a block diagram illustrating an example of an eye tracking configuration according to the embodiment of the present disclosure.

Next, a description will be given as to a configuration for eye tracking (hereinafter, referred to as an eye tracking configuration) extracted from the system configuration illustrated in FIG. 18. FIG. 19 is a block diagram illustrating an example of the eye tracking configuration according to the present embodiment.

As illustrated in FIG. 19, the eye tracking configuration includes the solid-state imaging device 100, the inertial sensor 607, and the main processor 601. As described above, the solid-state imaging device 100 includes an image sensor 611 and an EVS 612. It is noted that, in FIG. 19, the image sensor is referred to as a CIS.

The main processor 601 realizes a signal input unit 613, a signal processing unit 614, and an instruction generation unit 615, for example, by executing the program stored in the external memory 610.

Image frame data is input from the image sensor 611 of the solid-state imaging device 100 to the signal input unit 613, and event frame data is input from the EVS 612 thereto. Furthermore, information regarding an acceleration, an angular velocity, and the like (hereinafter, referred to as sensor data) detected by the inertial sensor 607 is also input to the signal input unit 613. The signal input unit 613 converts the above-described pieces of input data into a format that can be processed by the main processor 601, and then inputs the pieces of converted data to the signal processing unit 614.

The signal processing unit 614 executes various types of processing for eye tracking on the basis of the pieces of data input via the signal input unit 613, and inputs the results thereof to the instruction generation unit 615. It is noted that an operation including various types of processing for eye tracking executed in the main processor 601 will be described in detail later.

The instruction generation unit 615 generates an instruction for controlling the solid-state imaging device 100 on the basis of the results of the eye tracking input from the signal processing unit 614, and inputs the generated instruction to the solid-state imaging device 100.

1.6.1.4 Example of Operation Flow

Next, an eye tracking operation executed by the main processor 601 of the device 600 will be described.

(Overall Flow)

Figure 20:
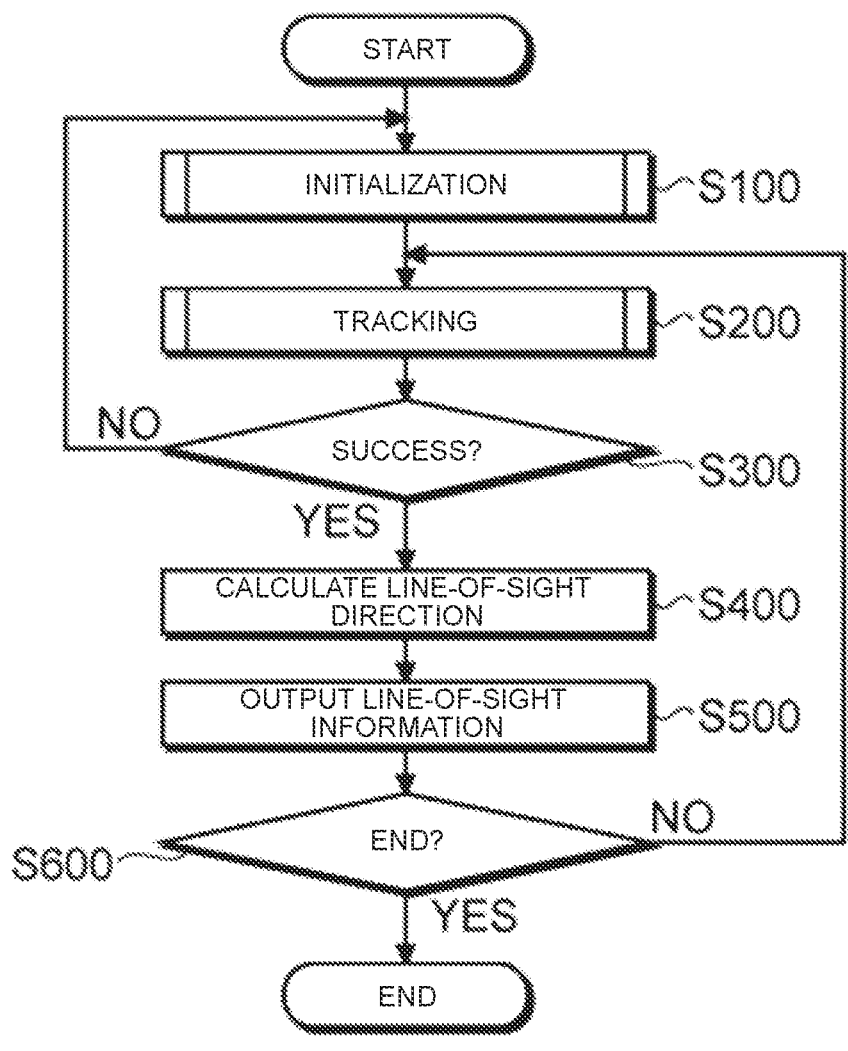
FIG. 20 is a flowchart illustrating an overall flow of an eye tracking operation according to the embodiment of the present disclosure.

FIG. 20 is a flowchart illustrating an overall flow of the eye tracking operation according to the present embodiment. As illustrated in FIG. 20, in the present operation, first, the main processor 601 executes initialization of various parameters including the position of the pupil (and Purkinje image) of a user (step S100). Details of the initialization will be described later in detail with reference to FIG. 21 or FIG. 22.

Next, the main processor 601 detects (tracks) the user's pupil (and Purkinje image) by using event frame data acquired by the EVS 612 (step S200). Details of this tracking will be described later in detail with reference to FIG. 23.

Next, the main processor 601 determines whether or not the tracking in step S200 has succeeded (step S300), and in a case where the tracking has failed, that is, in a case where the pupil (and Purkinje image) of the user cannot be detected and the line-of-sight direction of the user has been lost (NO in step S300), the processing returns to step S100 and the initialization is executed again.

On the other hand, when the tracking in step S200 has been successfully performed (YES in step S300), the main processor 601 calculates the line-of-sight direction of the user on the basis of the position of the pupil (and Purkinje image) of the user detected in step S200 (step S400), and outputs information regarding the calculated line-of-sight direction (hereinafter, referred to as line-of-sight information) (step S500).

Thereafter, the main processor 601 determines whether or not to end the present operation (step S600), and when the operation is not ended (NO in step S600), the processing returns to step S200 and continues the subsequent operations. On the other hand, when the processing is ended (YES in step S600), the main processor 601 ends the present operation.

(Initialization Flow)

Figure 21:
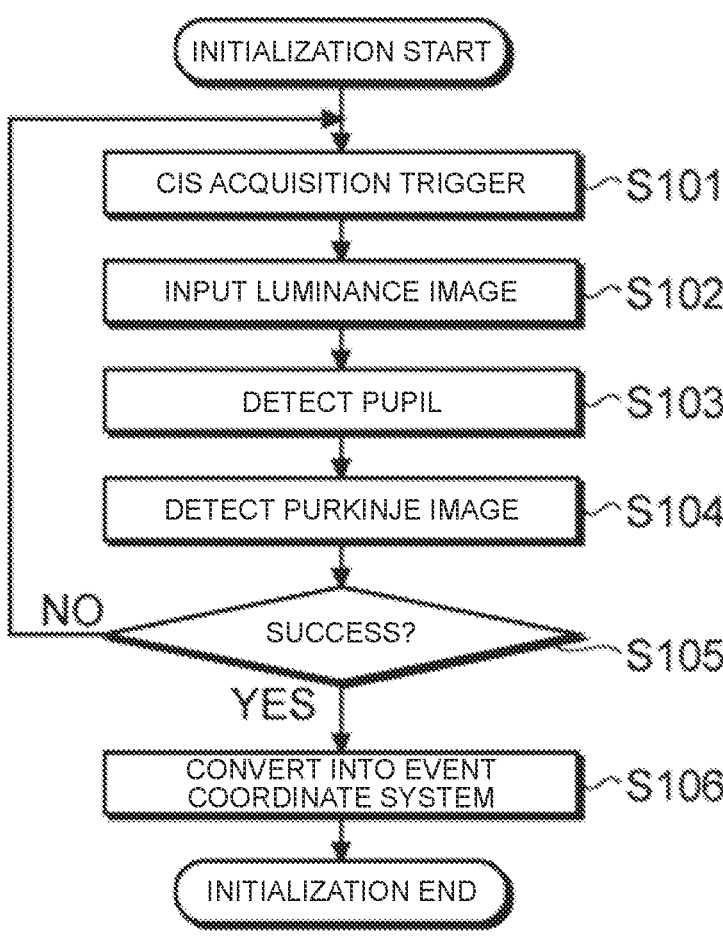
FIG. 21 is a flowchart illustrating an example of initialization according to the embodiment of the present disclosure.

FIG. 21 is a flowchart illustrating an example of the initialization illustrated in step S100 of FIG. 20. As illustrated in FIG. 21, in the initialization, the instruction generation unit 615 of the main processor 601 generates an instruction signal (also referred to as a CIS acquisition trigger) for generating image frame data (also referred to as a luminance image) in the image sensor 611, and inputs the instruction signal to the solid-state imaging device 100 (for example, the image sensor 611) (step S101).

When the image frame data is output from the image sensor 611 of the solid-state imaging device 100 in response to the input of the CIS acquisition trigger, the signal input unit 613 of the main processor 601 inputs the image frame data input from the solid-state imaging device 100 to the signal processing unit 614 (step S102).

When the image frame data is input, the signal processing unit 614 of the main processor 601 detects the position of the user's pupil in the image frame data by executing recognition processing on the input image frame data (step S103). It is noted that, for example, processing such as semantic segmentation may be used for this recognition processing.

In addition, the signal processing unit 614 of the main processor 601 detects the position of the Purkinje image in the image frame data by executing the recognition processing on the input image frame data (step S104). It is noted that detection of the Purkinje image is not essential, and step S104 may be omitted in a case where the Purkinje image is not used for detection of the line-of-sight direction of the user.

Next, the signal processing unit 614 of the main processor 601 determines whether or not the position of the user's pupil (and Purkinje image) in the image frame data has been successfully detected (step S105), and in a case where the detection has failed (NO in step S105), the processing returns to step S101, and the pupil (and Purkinje image) is detected for newly input image frame data again.

On the other hand, when the position of the pupil (and Purkinje image) of the user in the image frame data has been successfully detected (YES in step S105), the signal processing unit 614 of the main processor 601 converts the position of the pupil (and Purkinje image) of the user in the detected image frame data into the position in the coordinate system (hereinafter, referred to as an event coordinate system) of the event frame data (step S106). It is noted that this step may be omitted in a case where the coordinate system of the image frame data acquired by the image sensor 611 matches the coordinate system of the event frame data acquired by the EVS 612.

That is, in the present embodiment, as described above, although the optical axes of the image sensor 611 and the EVS 612 match each other, the resolutions (or sizes) of the frame data acquired by the image sensor 611 and the EVS 612 do not necessarily match each other. For example, as illustrated in FIG. 13, in the pixel separation configuration based on the Bayer array, in a case where three of the four pixels forming the array pattern 110A, which is a repeating unit of the pixel array, are defined as the luminance pixels 10 and one is defined as the event pixel 20, the resolution (or size) of the image frame data is twice the resolution (or size) of the event frame data. In that case, even when the same position in the real space is indicated, the coordinate position on the image frame data and the coordinate position on the event frame data do not match each other. Therefore, in the present embodiment, the coordinate position of the pupil (and Purkinje image) specified on the image frame data is converted into the coordinate position on the event frame data. In the case illustrated in FIG. 13, by multiplying the X coordinate and the Y coordinate of the coordinate position of the pupil (and Purkinje image) specified on the image frame data by ½, the coordinate position of the pupil (and Purkinje image) specified on the image frame data is converted into the coordinate position on the event frame data.

The position coordinates of the user's pupil (and Purkinje image) subjected to the coordinate conversion in step S106, or the position coordinates of the user's pupil (and Purkinje image) detected in steps S103 and S104 in a case where the coordinate conversion is unnecessary are stored in the signal processing unit 614 as a pupil parameter (and Purkinje image parameter) indicating the position of the user's latest pupil (and Purkinje image).

Thereafter, the main processor 601 ends the initialization (S100) and proceeds to the next step S200 in FIG. 20.

As described above, by adopting a configuration in which the processing returns to the initialization (S100) immediately after the activation or in a case where the tracking (S200) fails, and the image frame data is acquired on demand in the initialization, it is possible to drive the image sensor 611 as necessary, and thus, it is possible to reduce unnecessary power consumption.

(Modification of Initialization Flow)

Here, for example, a description will be given as to a modification of initialization in a case where the pixel separation configuration is adopted, that is, in a case where generation of event frame data can be executed in parallel with generation of image frame data.

Figure 22:
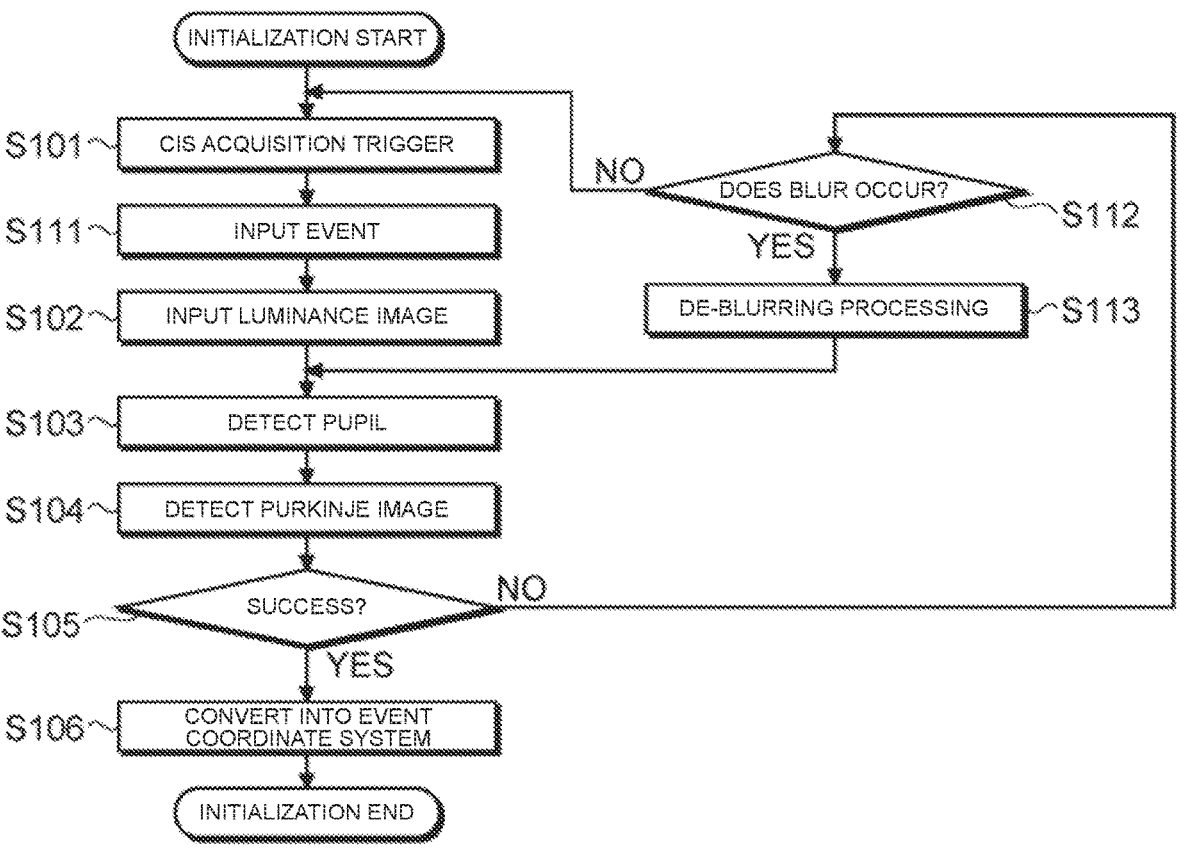
FIG. 22 is a flowchart illustrating a modification of initialization according to the embodiment of the present disclosure.

FIG. 22 is a flowchart illustrating a modification of the initialization illustrated in step S100 of FIG. 20. As illustrated in FIG. 22, in the present modification, in the flow similar to the initialization described above with reference to FIG. 21, step S111 is added after step S101, and as a result of the determination in step S105, in a case where the detection of the position of the user's pupil (and Purkinje image) in the image frame data has failed (NO in step S105), step S112 and step S113 are executed as necessary.

In step S111, the signal input unit 613 of the main processor 601 inputs the event frame data input from the EVS 612 of the solid-state imaging device 100 to the signal processing unit 614 in parallel with the input of the image frame data in step S102. That is, in the present modification, the image frame data and the event frame data are input as frame data for initialization. It is noted that the number of pieces of event frame data input from the solid-state imaging device 100 is not limited to one, and may be provided in plural.

In steps S103 and S104 according to the present modification, the positions of the user's pupil and the Purkinje image in the image frame data are detected by executing recognition processing on the image frame data and the event frame data, respectively.

In addition, in step S103 and/or S104, when the detection of the position of the user's pupil and/or the Purkinje image in the image frame data has failed (NO in step S105), the signal processing unit 614 of the main processor 601 determines whether or not blur has occurred in the image frame data (step S112). When blur does not occur (NO in step S112), that is, when the factor of the detection failure is not blur, the main processor 601 returns to step S101 and acquires image frame data again.

On the other hand, when blur has occurred in the image frame data (YES in step S112), the signal processing unit 614 of the main processor 601 performs de-blurring processing on the image frame data (step S113), and detects the position of the user's pupil and/or Purkinje image again using the processed image frame data and event frame data (steps S103 and S104).

The other processes and effects may be similar to those of the initialization illustrated in FIG. 21, and thus, a detailed description thereof will be omitted here.

(Tracking Flow)

Figure 23:
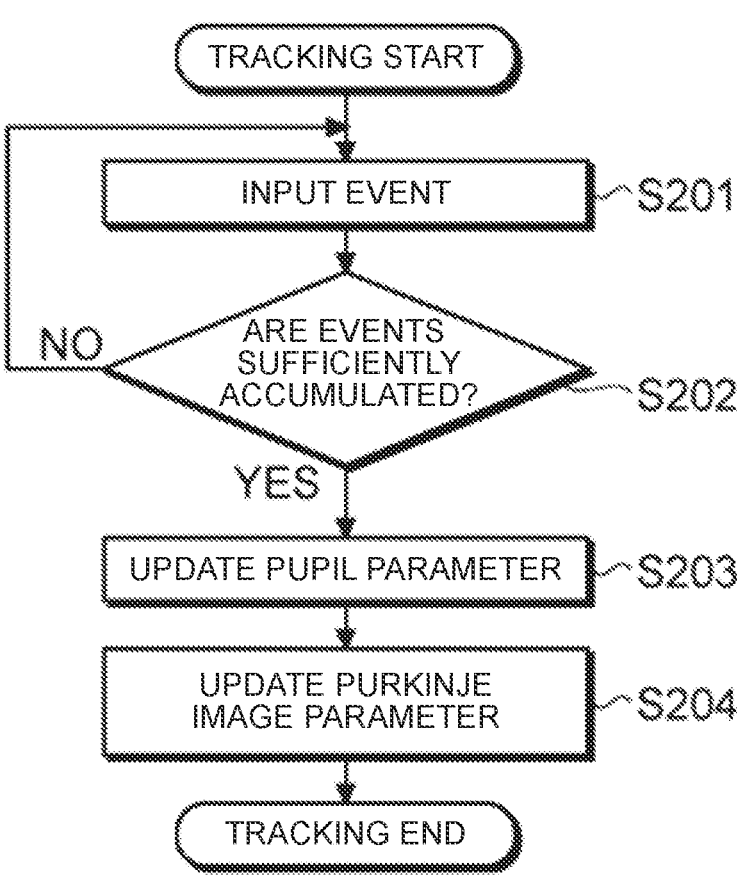
FIG. 23 is a flowchart illustrating an example of tracking according to the embodiment of the present disclosure.

FIG. 23 is a flowchart illustrating an example of tracking illustrated in step S200 of FIG. 20. As illustrated in FIG. 23, in the tracking, the signal input unit 613 of the main processor 601 inputs, to the signal processing unit 614, the event frame data input from the solid-state imaging device at a predetermined frame rate or at any timing (step S201). It is noted that the any timing may be, for example, a timing at which the predetermined number of pieces of event data is accumulated in the EVS 612 (for example, an unillustrated frame memory). Furthermore, for example, in a case where event data is output from the EVS 612 instead of event frame data, the signal input unit 613 may generate the event frame data by accumulating the input event data in a frame memory (not illustrated).

Next, the signal processing unit 614 of the main processor 601 waits until the sufficient number of pieces of event data is accumulated (NO in step S202). For example, in a case where event data is input from the signal input unit 613 in the form of event frame data, the signal processing unit 614 determines whether or not the total number of pieces of event data included in the input one or more pieces of event frame data is equal to or greater than a preset threshold value. In that case, in a case where one piece of event frame data includes the sufficient number of pieces of event data (equal to or greater than a threshold value), the signal processing unit 614 may determine that the sufficient number of pieces of event data has been accumulated for an input of one piece of event frame data. Furthermore, in a case where the signal input unit 613 accumulates the event data input from the EVS 612 in a frame buffer, the signal processing unit 614 may determine whether or not the number of pieces of event data accumulated in the frame buffer is equal to or greater than a threshold value.

In a case where the sufficient number of pieces of event data is accumulated (YES in step S202), the signal processing unit 614 specifies the position coordinates of the user's pupil in the event frame data by executing the recognition processing on the event frame data formed by the accumulated event data and the stored pupil parameter, and updates the stored pupil parameter with the specified position coordinates of the pupil (step S203). For example, in step S203, the signal processing unit 614 may specify the position coordinates of the user's pupil by setting the vicinity of the stored pupil parameter as a search range with respect to the event frame data. At that time, the signal processing unit 614 may use the stored pupil parameter as an initial value of optimization processing for estimating a circle or an ellipse parameter forming the pupil.

Furthermore, the signal processing unit 614 executes the recognition processing on the event frame data formed by the accumulated event data and the stored Purkinje image parameter to specify the position coordinates of the user's Purkinje image in the event frame data, and updates the stored Purkinje image parameter with the specified position coordinates of the Purkinje image (step S204). For example, in step S204, the signal processing unit 614 may specify the position coordinates of the Purkinje image of the user by setting the vicinity of the stored Purkinje image parameter as the search range with respect to the event frame data. At that time, the signal processing unit 614 may use the stored Purkinje image parameter as an initial value of the optimization processing for estimating a circle or ellipse parameter forming the Purkinje image.

Thereafter, the main processor 601 ends the tracking (S200) and proceeds to the next step S300 in FIG. 20.

1.6.2 SLAM

Next, a description will be given as to an application example of the information processing apparatus 1 for the purpose of SLAM.

1.6.2.1 Example of Device

As an application example of the information processing apparatus 1 for the purpose of SLAM, similarly to eye tracking, an AR device equipped with an AR function and a VR device equipped with a VR function are exemplified. It is noted that, in the following description, configurations, operations, and effects similar to those in the case of the above-described eye tracking are cited, and thus, redundant description will be omitted.

(Example of AR Device)

Figure 24:
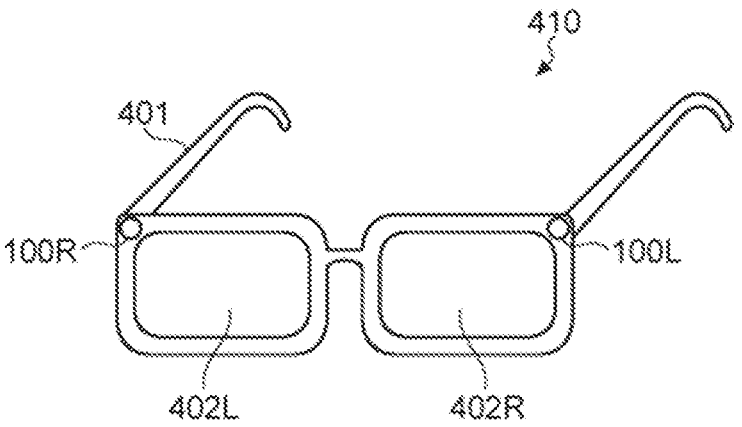
FIG. 24 is a schematic diagram illustrating an example of the AR device according to the embodiment of the present disclosure.

FIG. 24 is a schematic diagram illustrating an example of the AR device according to the present embodiment. As illustrated in FIG. 24, an AR device 410 includes, for example, a frame 401, displays 402L and 402R, and solid-state imaging devices 100L and 100R as sensors. The frame 401, the displays 402L and 402R may be similar to those of the AR device 400 for eye tracking described above.

For example, the solid-state imaging devices 100L and 100R are provided on the rim of the frame 401 so as to face the same direction as the user's line-of-sight direction. Each of the solid-state imaging device 100L and the solid-state imaging device 100R may have a configuration similar to that of the solid-state imaging device 100 described above.

(Example of VR Device)

Figure 25:
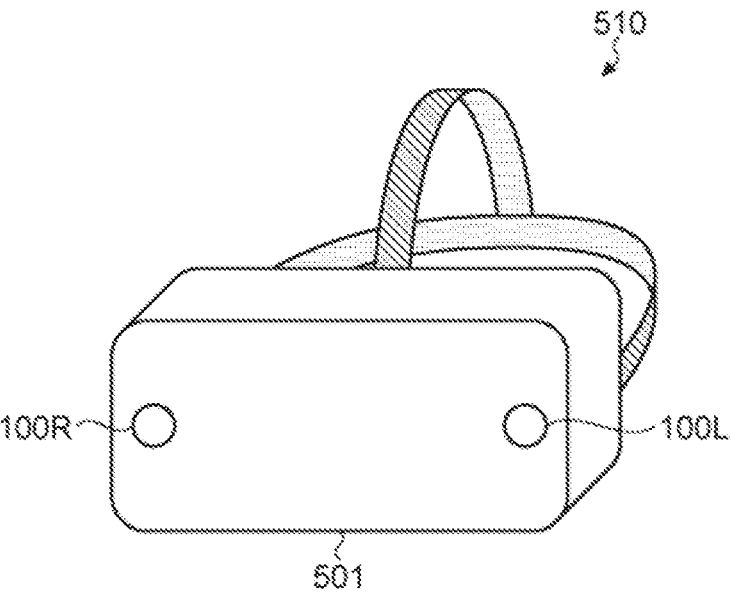
FIG. 25 is a schematic diagram illustrating an example of the VR device according to the embodiment of the present disclosure.

FIG. 25 is a schematic diagram illustrating an example of the VR device according to the present embodiment. As illustrated in FIG. 25, a VR device 510 includes, for example, a frame 501, a display (not illustrated), and solid-state imaging devices 100L and 100R as sensors, similarly to the AR device 410 illustrated in FIG. 24. The frame 501 and the display may be similar to those of the VR device 500 for eye tracking described above.

In the frame 501, similarly to the AR device 400, the solid-state imaging devices 100L and 100R are provided so as to face the same direction as the user's line-of-sight direction.

1.6.2.2 Example of System Configuration and SLAM Configuration

A system configuration example of the AR device 410 and the VR device 510 (hereinafter, simply referred to as a device) for SLAM may be similar to the system configuration example described above with reference to FIG. 18. Furthermore, a configuration for SLAM (hereinafter, referred to as a SLAM configuration) in the device 600 may be similar to the configuration example described above with reference to FIG. 19. However, in the SLAM configuration, the signal processing unit 614 of the main processor 601 executes various types of processing for SLAM (SLAM operation) instead of various types of processing for eye tracking (eye tracking operation).

1.6.2.3 Example of Operation Flow

Next, the SLAM operation executed by the main processor 601 of the device 600 will be described.

(Overall Flow)

Figure 26:
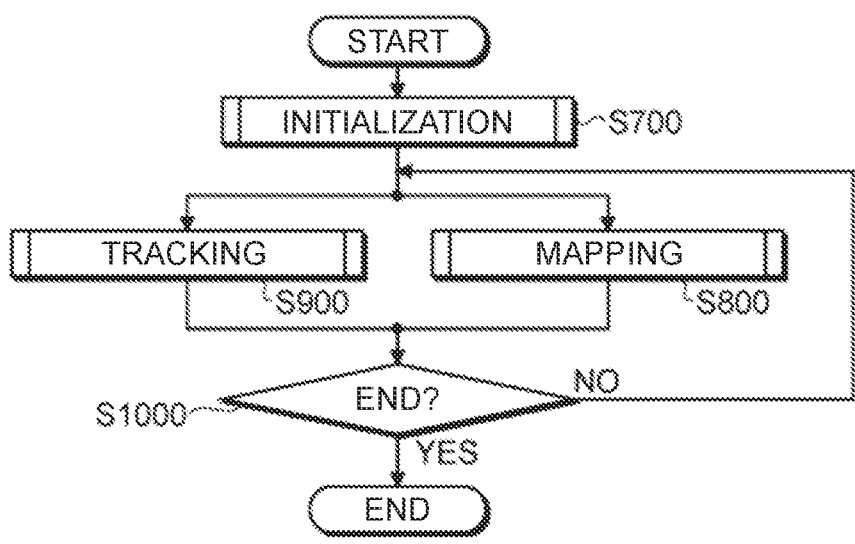
FIG. 26 is a flowchart illustrating an overall flow of a SLAM operation according to the embodiment of the present disclosure.

FIG. 26 is a flowchart illustrating the overall flow of the SLAM operation according to the present embodiment. As illustrated in FIG. 26, in the present operation, first, the main processor 601 executes initialization of various parameters including the self-position of the device 600 (step S700). Details of the initialization will be described later in detail with reference to FIG. 27.

Next, details of mapping (S800) and tracking (S900) in which the main processor 601 executes mapping using the image frame data acquired by the image sensor 611 (step S800) and tracking of the self-position using the event frame data acquired by the EVS 612 (step S900) in parallel will be described later in detail with reference to FIGS. 28 to 36.

Thereafter, the main processor 601 determines whether or not to end the present operation (step S1000), and when the operation is not ended (NO in step S1000), the processing returns to steps S800 and S900 and continues the subsequent operations. On the other hand, when the processing is ended (YES in step S1000), the main processor 601 ends the present operation.

(Initialization Flow)

Figure 27:
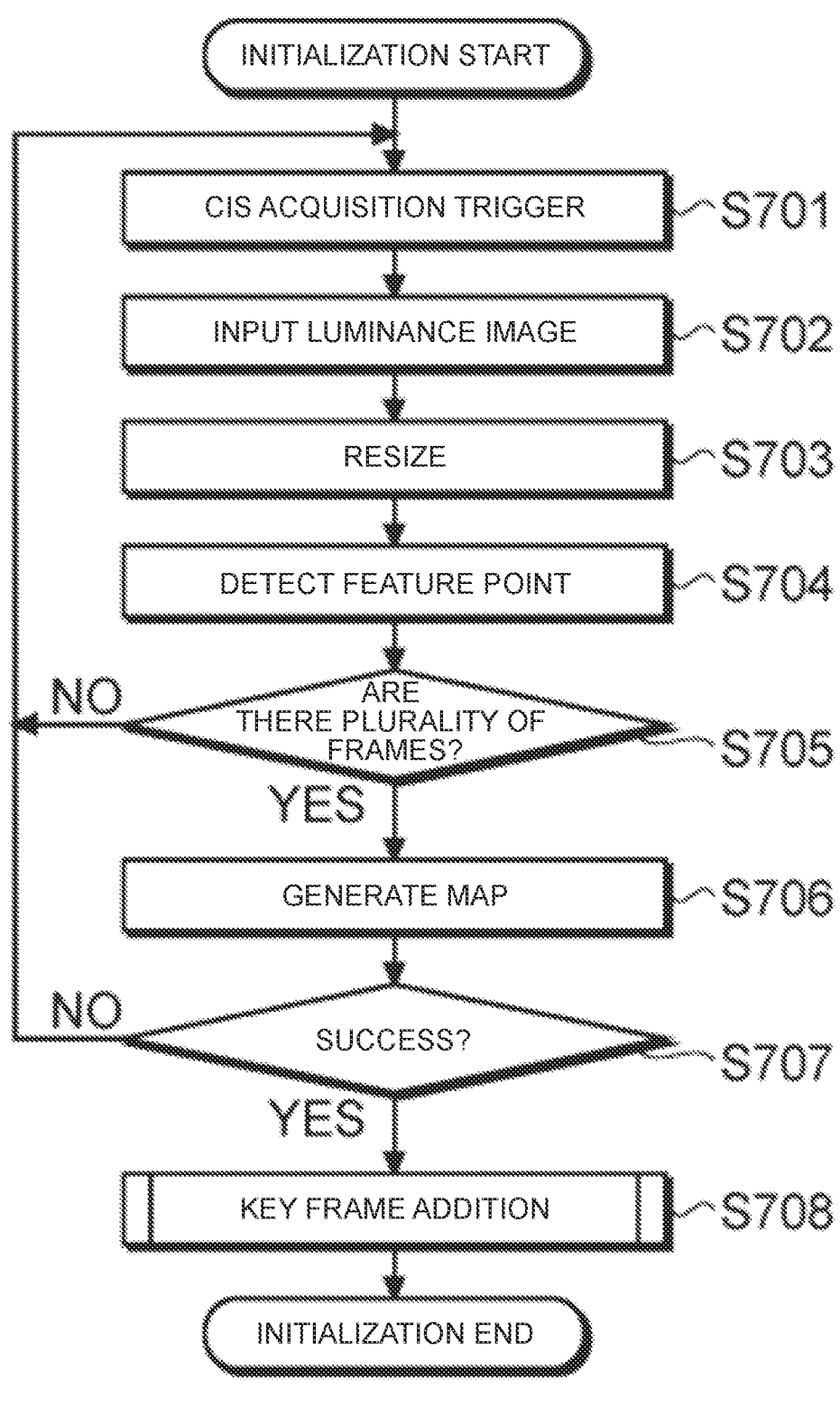
FIG. 27 is a flowchart illustrating an example of initialization according to the embodiment of the present disclosure.

FIG. 27 is a flowchart illustrating an example of initialization illustrated in step S700 of FIG. 26. As illustrated in FIG. 27, in the initialization, the instruction generation unit 615 of the main processor 601 generates an instruction signal (CIS acquisition trigger) for generating image frame data (also referred to as a luminance image) in the image sensor 611, and inputs the generated instruction signal to the solid-state imaging device 100 (for example, the image sensor 611) (step S701).

When the image frame data is output from the image sensor 611 of the solid-state imaging device 100 in response to the input of the CIS acquisition trigger, the signal input unit 613 of the main processor 601 inputs the image frame data input from the solid-state imaging device 100 to the signal processing unit 614 (step S702).

When the image frame data is input, the signal processing unit 614 of the main processor 601 performs resizing for matching the size of the image frame data with the size of the event frame data (step S703). It is noted that this processing assumes that the angle of view of the image frame data input to the main processor 601 and the angle of view of the event frame data match each other. Therefore, in a case where the angle of view of the image frame data and the angle of view of the event frame data do not match each other, clipping of a region for causing the two angles of view to match each other may be executed.

Next, the signal processing unit 614 of the main processor 601 executes feature point detection processing on the input image frame data (step S704). For the detection of the feature point, for example, in order to secure continuity with feature point tracking processing described later with reference to step S903 in FIG. 29, consistency of output results, and the like, it is preferable to use a Harris Corner Detector based on a principle similar to that of Non Patent Literature 1, an algorithm derived therefrom, and the like.

Next, the signal processing unit 614 of the main processor 601 determines whether or not the predetermined number or more of resized image frame data of two or more is stocked (step S705), and in a case where the image frame data is not stocked (NO in step S705), the processing returns to step S701 and continues the subsequent operations.

On the other hand, when the predetermined number or more of resized image frame data of two or more is stocked (YES in step S705), the signal processing unit 614 of the main processor 601 executes map generation using the predetermined number or more of resized image frame data of two or more (step S706). It is noted that the map generation in step S706 may be similar to map generation in normal SLAM.

Next, the signal processing unit 614 of the main processor 601 determines whether or not the map generation has succeeded in step S706 (step S707), and when the map generation has failed (NO in step S707), the processing returns to step S701 and the subsequent operations are executed again. On the other hand, in a case where the map has been successfully generated, the signal processing unit 614 of the main processor 601 executes processing of adding a key frame (step S708). Thereafter, the initialization (S700) ends, and the processing proceeds to the next steps S800 and S900 in FIG. 26. It is noted that details of the key frame addition will be described later in detail with reference to FIGS. 31 to 33.

(Mapping Flow)

Figure 28:
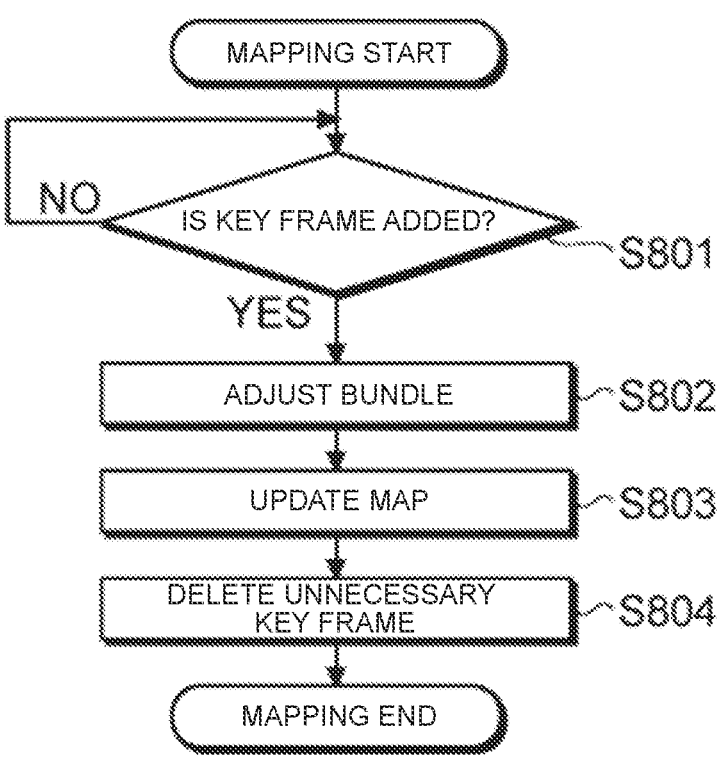
FIG. 28 is a flowchart illustrating an example of mapping according to the embodiment of the present disclosure.

FIG. 28 is a flowchart illustrating an example of mapping illustrated in step 3800 of FIG. 26. As illustrated in FIG. 28, in the mapping, the signal input unit 613 of the main processor 601 waits for the addition of the key frame (NO in step S801), and when the key frame is added (YES in step S801), the signal input unit 613 adjusts a point cloud map such as a grid map or a voxel map by executing bundle adjustment on the basis of a coordinate system of the key frame (step S802). Then, the signal processing unit 614 of the main processor 601 updates, for example, the point cloud map managed in the main memory 602 with the adjusted point cloud map (step S803).

Thereafter, the signal processing unit 614 of the main processor 601 deletes an unnecessary key frame from a key frame list (refer to FIG. 32) to be described later (step S804), then terminates the mapping (S800), and proceeds to the next step S1000 in FIG. 26.

(Tracking Flow)

Figure 29:
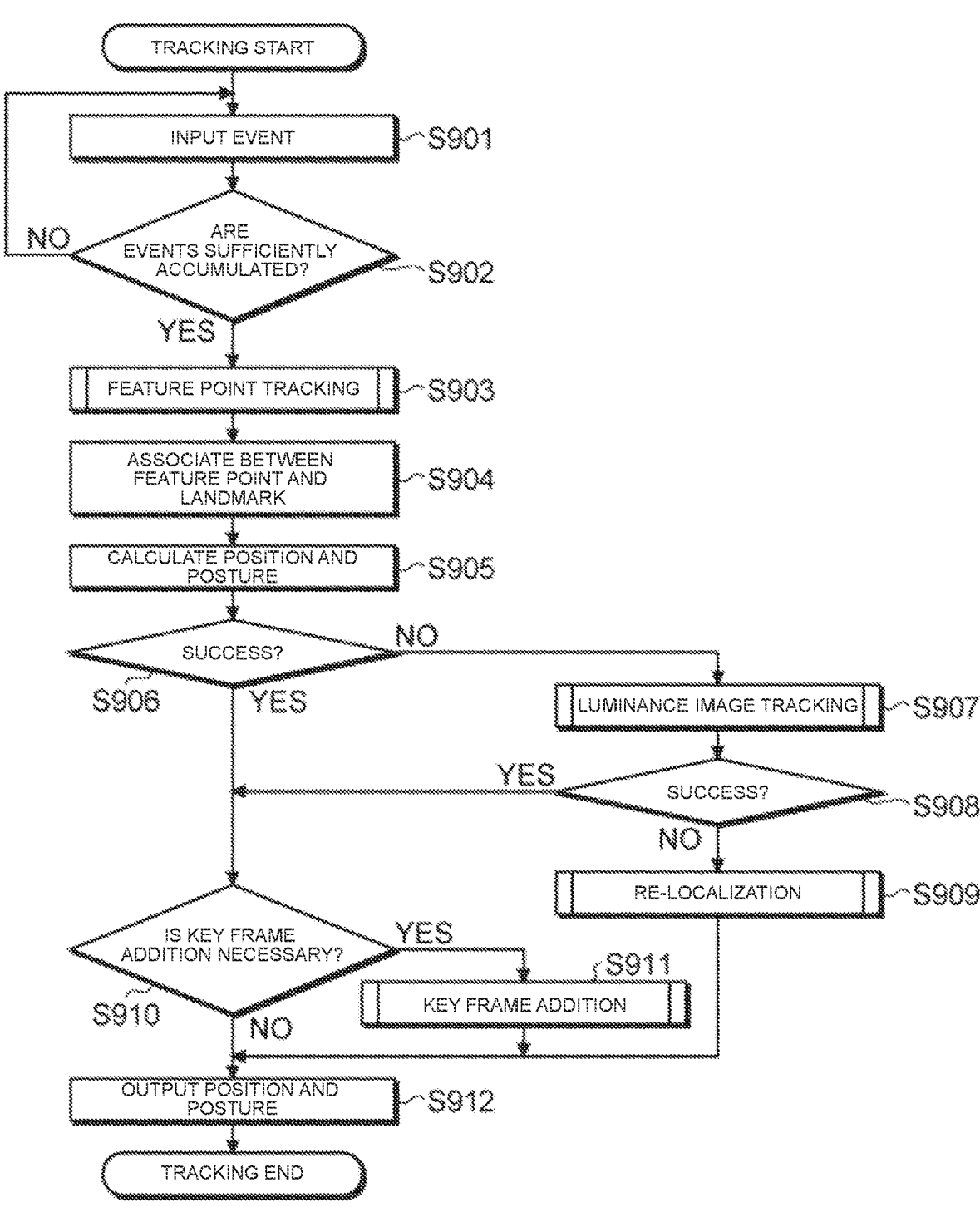
FIG. 29 is a flowchart illustrating an example of tracking according to the embodiment of the present disclosure.

FIG. 29 is a flowchart illustrating an example of tracking illustrated in step S900 of FIG. 26. As illustrated in FIG. 29, in the tracking, the signal processing unit 614 of the main processor 601 waits until the sufficient number of pieces of event data is accumulated, for example, as in steps S201 and S202 in FIG. 23 (steps S901 and S902).

In a case where the sufficient number of pieces of event data has been accumulated (YES in step S902), the signal processing unit 614 executes feature point tracking processing on the event frame data formed by the accumulated event data (step S903), and executes association between a feature point tracked in this manner and a landmark in the point cloud map (step S904). It is noted that details of the feature point tracking will be described later in detail with reference to FIG. 36, but for example, the above-described method according to Non Patent Literature 1 or the like may be used.

Next, the signal processing unit 614 of the main processor 601 calculates a position and a posture of the device 600 on the basis of the event frame data used in step S903 and the latest point cloud map (step S905).

After calculating the position and the posture of the device 600 in this manner, the signal processing unit 614 of the main processor 601 then determines whether or not the calculated position and posture are correct (step S906). In step S906, for example, it may be determined whether or not the correct position and posture of the device 600 are calculated in step S905 on the basis of consistency between the position and the posture of the device 600 obtained from sensor information such as acceleration and angular velocity input from the inertial sensor 607 and the position and the posture of the device 600 calculated in step S905.

When the correct position and posture have been calculated in step S905 (YES in step S906), the main processor 601 proceeds to step S910. On the other hand, when the correct position and/or posture has not been calculated (NO in step S906), the signal processing unit 614 of the main processor 601 executes tracking (luminance image tracking) using the image frame data (step S907). It is noted that details of the luminance image tracking will be described later in detail with reference to FIG. 35.

Next, the signal processing unit 614 of the main processor 601 determines whether or not the calculation of the correct position and/or posture of the device 600 has been successfully performed by the luminance image tracking in step S907 (step S908), and proceeds to step S910 when the calculation has been successfully performed (YES in step S908). On the other hand, when the calculation of the correct position and/or posture has failed (NO in step S908), the signal processing unit 614 of the main processor 601 executes re-localization (step S909), and then proceeds to step S912. It is noted that details of the re-localization will be described later in detail with reference to FIG. 34.

In step S910, the signal processing unit 614 of the main processor 601 determines whether or not to add a key frame to the key frame list. When determining not to add the key frame (NO in step S910), the signal processing unit 614 proceeds to step S912. On the other hand, when determining to add the key frame (YES in step S910), the signal processing unit 614 executes processing of adding the key frame to the key frame list (step S911), and then proceeds to step S912. It is noted that details of the key frame addition will be described later in detail with reference to FIGS. 31 to 33, similarly to step S708 described above.

In step S912, the signal processing unit 614 of the main processor 601 outputs information regarding the position and the posture of the device 600 calculated in step S905, S907, or S909 (hereinafter, referred to as position and posture information) (step S912), then terminates the tracking (S900), and proceeds to the next step S1000 in FIG. 26.

(Modification of Tracking Flow)

Here, for example, a description will be given as to a modification of tracking in a case where the pixel sharing configuration is adopted, that is, in a case where generation of event frame data cannot be executed in parallel with generation of image frame data.

Figure 30:
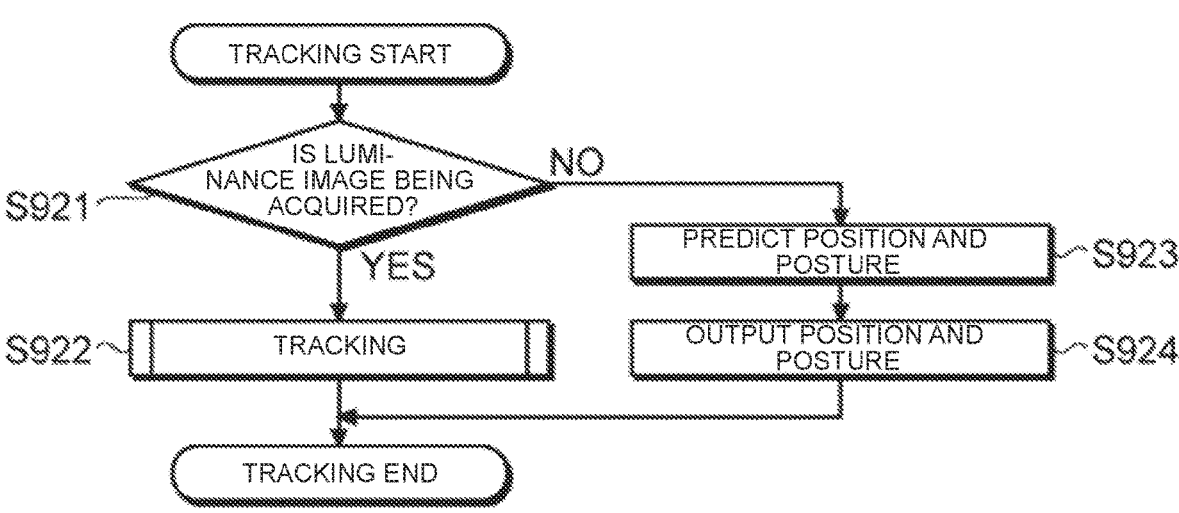
FIG. 30 is a flowchart illustrating a modification of the tracking according to the embodiment of the present disclosure.

FIG. 30 is a flowchart illustrating the modification of the tracking illustrated in step 3900 of FIG. 26. As illustrated in FIG. 30, in the present modification, the signal processing unit 614 of the main processor 601 determines whether or not the image sensor 611 of the solid-state imaging device 100 is acquiring image frame data (step S921). When the image frame data is not being acquired (NO in step S921), the main processor 601 executes tracking illustrated in FIG. 29 (step S922), then terminates the tracking (S900), and proceeds to the next step S1000 in FIG. 26.

On the other hand, when the image frame data is being acquired (YES in step S921), the signal processing unit 614 of the main processor 601 predicts the position and the posture of the device 600 (step S923), and outputs position and posture information regarding the position and the posture of the device 600 predicted as described above (step S924). Thereafter, the main processor 601 ends the tracking (S900) and proceeds to the next step S1000 in FIG. 26.

It is noted that a method of predicting the position and the posture in step S923 is not particularly limited, and for example, the current position and posture may be predicted from a history of the position and the posture of the device 600 until immediately before, or the position and the posture calculated on the basis of the sensor information input from the inertial sensor 607 may be the current position and posture of the device 600.

(Key Frame Addition Flow)

Figure 31:
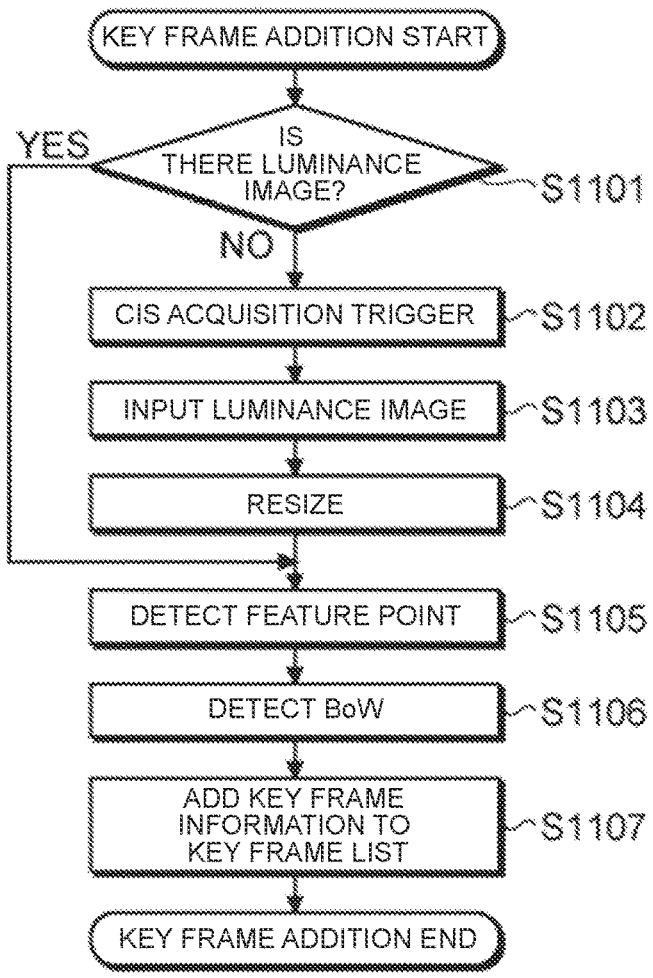
FIG. 31 is a flowchart illustrating an example of key frame addition according to the embodiment of the present disclosure.

FIG. 31 is a flowchart illustrating an example of the key frame addition illustrated in step S708 of FIG. 27 or step S911 of FIG. 29. As illustrated in FIG. 31, in the key frame addition, the signal processing unit 614 of the main processor 601 first determines whether or not there is image frame data acquired during one execution of the processing illustrated in FIG. 27 (step S1101), and when there is the image frame data (YES in step S1101), the processing proceeds to step S1105. On the other hand, in a case where there is no image frame data acquired during one execution (NO in step S1101), for example, as in steps S701 to S703 of FIG. 27, the instruction generation unit 615 generates a CIS acquisition trigger and inputs the trigger to the solid-state imaging device 100 (for example, the image sensor 611) (step S1102), so that the signal input unit 613 inputs the image frame data from the solid-state imaging device 100 and inputs the input image frame data to the signal processing unit 614 (step S1103). Then, the signal processing unit 614 performs resizing for matching the size of the input image frame data with the size of the event frame data (step S1104). That is, in the operation illustrated in FIG. 27, since the image frame data is newly acquired and resized in steps S701 to S703, step S1105 can be executed without acquiring the image frame data again in the operation illustrated in FIG. 31. Similarly, in a case where step S911 is executed via step S907 in the operation illustrated in FIG. 29, the image frame data is newly acquired and resized in step S907. Therefore, in the operation illustrated in FIG. 31, step S1105 can be executed without newly acquiring the image frame data again. On the other hand, in a case where step S911 is executed without passing through step S907 in the operation illustrated in FIG. 29, the image frame data is not acquired during one execution. Therefore, in the operation illustrated in FIG. 31, it is necessary to execute acquisition and resizing of the image frame data again.

Next, the signal processing unit 614 of the main processor 601 executes feature point detection processing on the input image frame data (step S1105). In the detection of feature points, similarly to step S704 of FIG. 27 described above, for example, in order to secure continuity with the feature point tracking processing to be described later with reference to step S903 of FIG. 29, consistency of output results, and the like, it is preferable to use the Harris Corner Detector based on the principle similar to that of Non Patent Literature 1, an algorithm derived therefrom, and the like.

Next, the signal processing unit 614 of the main processor 601 executes optimization of a correspondence relationship between the feature point detected in step S1105 and the landmark in the point cloud map by executing detection of a bag of visual words (BoW) (step S1106).

Next, the signal processing unit 614 of the main processor 601 generates key frame information on the basis of the correspondence relationship optimized in step S1106, and adds the generated key frame information to, for example, the key frame list managed in the main memory 602 (step S1107). Thereafter, the main memory 602 ends the key frame addition (S708 and S911) and proceeds to the next step in FIG. 27 (that is, steps S800 and S900 in FIG. 26) or the next step S912 in FIG. 29.

Figure 32:
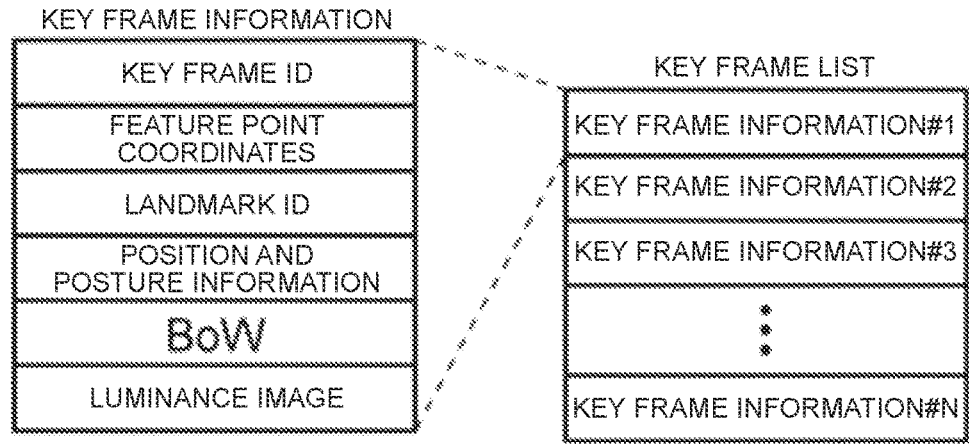
FIG. 32 illustrates an example of key frame information and a key frame list according to the embodiment of the present disclosure.

It is noted that FIG. 32 illustrates an example of the key frame information and the key frame list according to the present embodiment. As illustrated in FIG. 32, the key frame list stores a list of one or more pieces of key frame information #1 to #N (N is an integer of one or more). Each key frame information includes, for example, a key frame ID for uniquely identifying a key frame, coordinates (feature point coordinates) of a feature point indicated by the key frame, a landmark ID for uniquely identifying a landmark corresponding to the feature point, position and posture information of the device 600 when the feature point is detected, information regarding BoW detected in step S1106, and image frame data (luminance image) used to generate the key frame.

(Modification of Key Frame Addition Flow)

Here, for example, a description will be given as to a modification of the key frame addition in a case where the pixel separation configuration is adopted, that is, in a case where generation of event frame data can be executed in parallel with generation of image frame data.

Figure 33:
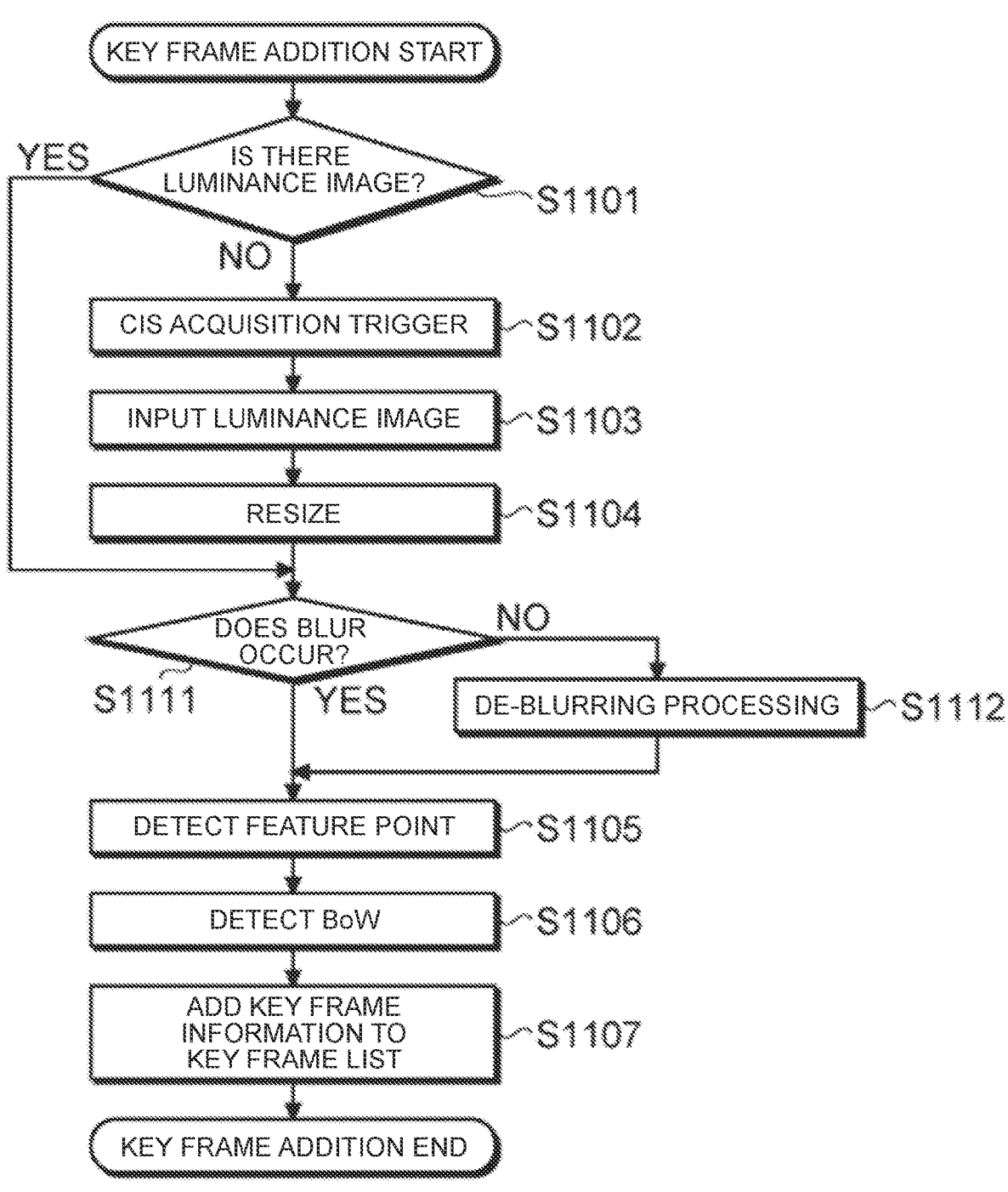
FIG. 33 is a flowchart illustrating a modification of the key frame addition according to the embodiment of the present disclosure.

FIG. 33 is a flowchart illustrating a modification of the key frame addition illustrated in step S708 of FIG. 27 or step S911 of FIG. 29. As illustrated in FIG. 33, in the key frame addition flow according to the present modification, steps S1111 and S1112 are added between steps S1104 and S1105 in a flow similar to the key frame addition flow illustrated in FIG. 31.

In step S1111, the signal processing unit 614 of the main processor 601 determines whether or not blur has occurred in the image frame data. When blur does not occur (NO in step S1111), the main processor 601 proceeds to step S1105. On the other hand, when blur has occurred in the image frame data (YES in step S112), the signal processing unit 614 of the main processor 601 performs de-blurring processing on the image frame data (step S1112), and then proceeds to step S1105.

It is noted that the processing of steps S1111 and S1112 may also be provided between steps S703 and S704 in the initialization flow illustrated in FIG. 27. Similarly, the processing of steps S1111 and S1112 may also be provided between steps S1303 and S1304 in a luminance image tracking flow illustrated in FIG. 35 to be described later.

(Re-Localization Flow)

Figure 34:
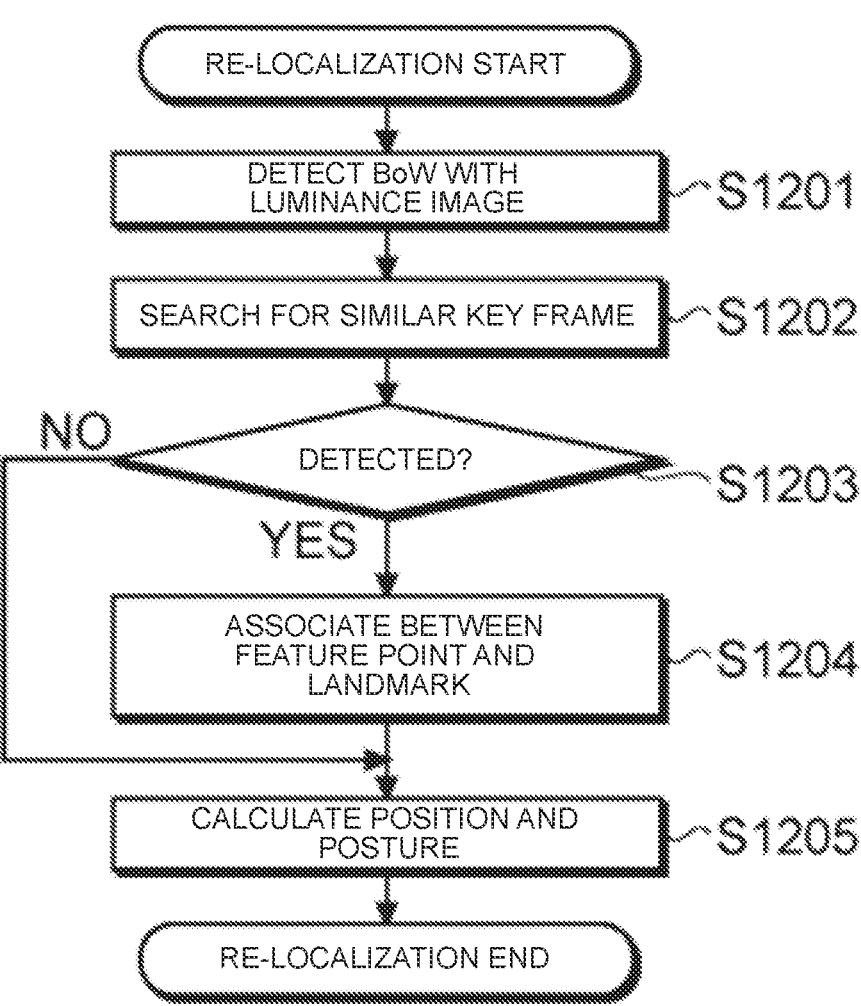
FIG. 34 is a flowchart illustrating an example of re-localization according to the embodiment of the present disclosure.

FIG. 34 is a flowchart illustrating an example of the re-localization illustrated in step S909 of FIG. 29. As illustrated in FIG. 34, in the re-localization, the signal processing unit 614 of the main processor 601 performs BoW detection on the resized image frame data acquired in step S907 of FIG. 29 (step S1201).

Next, the signal processing unit 614 of the main processor 601 searches for a similar key frame in the key frame list (step S1202), and determines whether or not the similar key frame has been found (step S1203).

When no similar key frame has been found in the search in step S1202 (NO in step S1203), the signal processing unit 614 of the main processor 601 proceeds to step S1206. On the other hand, when the similar key frame has been found (YES in step S1203), the signal processing unit 614 executes association between a feature point optimized in step S1201 and a landmark in the latest point cloud map (step S1205), and proceeds to step S1206.

In step S1206, the signal processing unit 614 of the main processor 601 calculates the position and the posture of the device 600 on the basis of the image frame data acquired and resized in step S907 of FIG. 29 and the latest point cloud map, then terminates the re-localization (S909), and proceeds to the next step S912 in FIG. 29.

(Luminance Image Tracking Flow)

FIG. 35 is a flowchart illustrating an example of the luminance image tracking illustrated in step S907 of FIG. 29. As illustrated in FIG. 35, in the case of the luminance image tracking, first, for example, as in steps S701 to S703 of FIG. 27, in the signal processing unit 614 of the main processor 601, the instruction generation unit 615 generates a CIS acquisition trigger and inputs the trigger to the solid-state imaging device 100 (for example, the image sensor 611) (step S1301), so that the signal input unit 613 inputs image frame data from the solid-state imaging device 100, and inputs the input image frame data to the signal processing unit 614 (step S1302). Then, the signal processing unit 614 performs resizing for matching the size of the input image frame data with the size of the event frame data (step S1303).

Next, the signal processing unit 614 of the main processor 601 executes feature point detection processing on the acquired and resized image frame data (step S1304), and executes association between the feature point detected as described above and the landmark in the point cloud map (step S1305).

Next, the signal processing unit 614 of the main processor 601 calculates the position and the posture of the device 600 on the basis of the image frame data used in step S1304 and the latest point cloud map (step S1306), then terminates the luminance image tracking (S907), and proceeds to the next step S908 in FIG. 29.

(Feature Point Tracking Flow)

FIG. 36 is a flowchart illustrating an example of the feature point tracking illustrated in step S903 of FIG. 29. It is noted that the feature point tracking flow illustrated in FIG. 36 may be based on, for example, Non Patent Literature 1.

As illustrated in FIG. 36, in the feature point tracking, the signal processing unit 614 of the main processor 601 first executes accumulation of the necessary number of pieces of event data (step S1401). It is noted that, for example, this step S1401 may be similar to the processes of steps S201 and S202 in FIG. 23. In addition, this step S1401 may be, for example, a process of securing ΔL(u) that satisfies Formula (2) in Non Patent Literature 1.

Next, the signal processing unit 614 of the main processor 601 calculates a conversion/displacement amount of the feature point (step S1402). It is noted that this step S1402 may be, for example, a process of obtaining p and v by optimizing Formula (7) in Non Patent Literature 1.

Next, the signal processing unit 614 of the main processor 601 executes processing of converting feature point coordinates (step S1403). It is noted that this step S1403 may be, for example, a process of converting p and v obtained in step S1402 into feature point coordinates.

Thereafter, the signal processing unit 614 of the main processor 601 ends the feature point tracking (S903) and proceeds to the next step S904 in FIG. 29.

1.7 Summary

As described above, according to the present embodiment, since the luminance pixel 10 forming the image sensor and the event pixel 20 forming the EVS are uniformly mixed and arranged in the pixel array unit 101, the optical axes of the image sensor and the EVS can match each other or substantially match each other. Accordingly, even in a case where a sensor used in eye tracking, SLAM, or the like is switched between, for example, the image sensor and the EVS, it is possible to omit or simplify processing such as geometric conversion for matching coordinate systems of image data acquired by the respective sensors. As a result, it is possible to prevent an increase in processing speed from being suppressed.

Furthermore, by adopting a configuration in which the luminance pixel 10 and the event pixel 20 are mixed in the pixel array unit 101, as in a case where the image sensor and the EVS are configured using different chips, it is possible to suppress waste of power due to a sensor that is not used and is always in the ON state, and as such, it is possible to suppress an increase in power consumption.

Furthermore, since the image frame data is acquired on demand (input of the CIS acquisition trigger) as necessary immediately after activation or in a case where an object is lost (for example, a detection failure of the user's pupil (and Purkinje image), a calculation failure of the position and the posture of the device 600, and the like), the image sensor 611 is driven only as necessary. Accordingly, unnecessary power consumption can be reduced.

2. Application Example to Moving Body

The technique according to the present disclosure can be applied to various products. For example, the technique according to the present disclosure may be implemented as a device mounted on any type of moving body such as an automobile, an electric vehicle, a hybrid electric vehicle, a motorcycle, a bicycle, a personal mobility, an airplane, a drone, a ship, and a robot.

Figure 37:
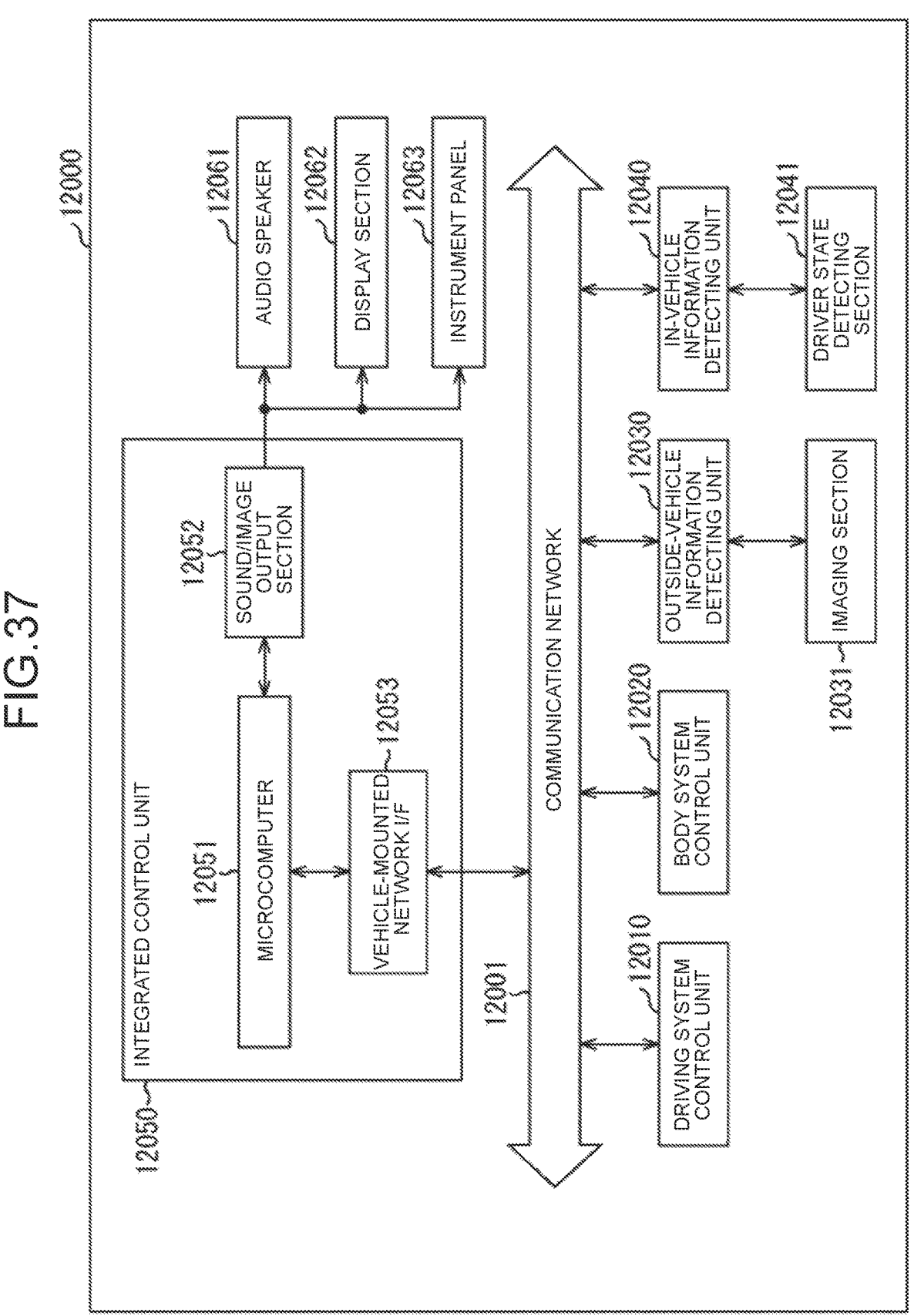
FIG. 37 is a block diagram depicting an example of schematic configuration of a vehicle control system.

FIG. 37 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 37, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 37, an audio speaker 12061, a display section 12062, and an instrument panel 12063 are illustrated as the output device. The display section 12062 may, for example, include at least one of an on-board display and a head-up display.

Figure 38:
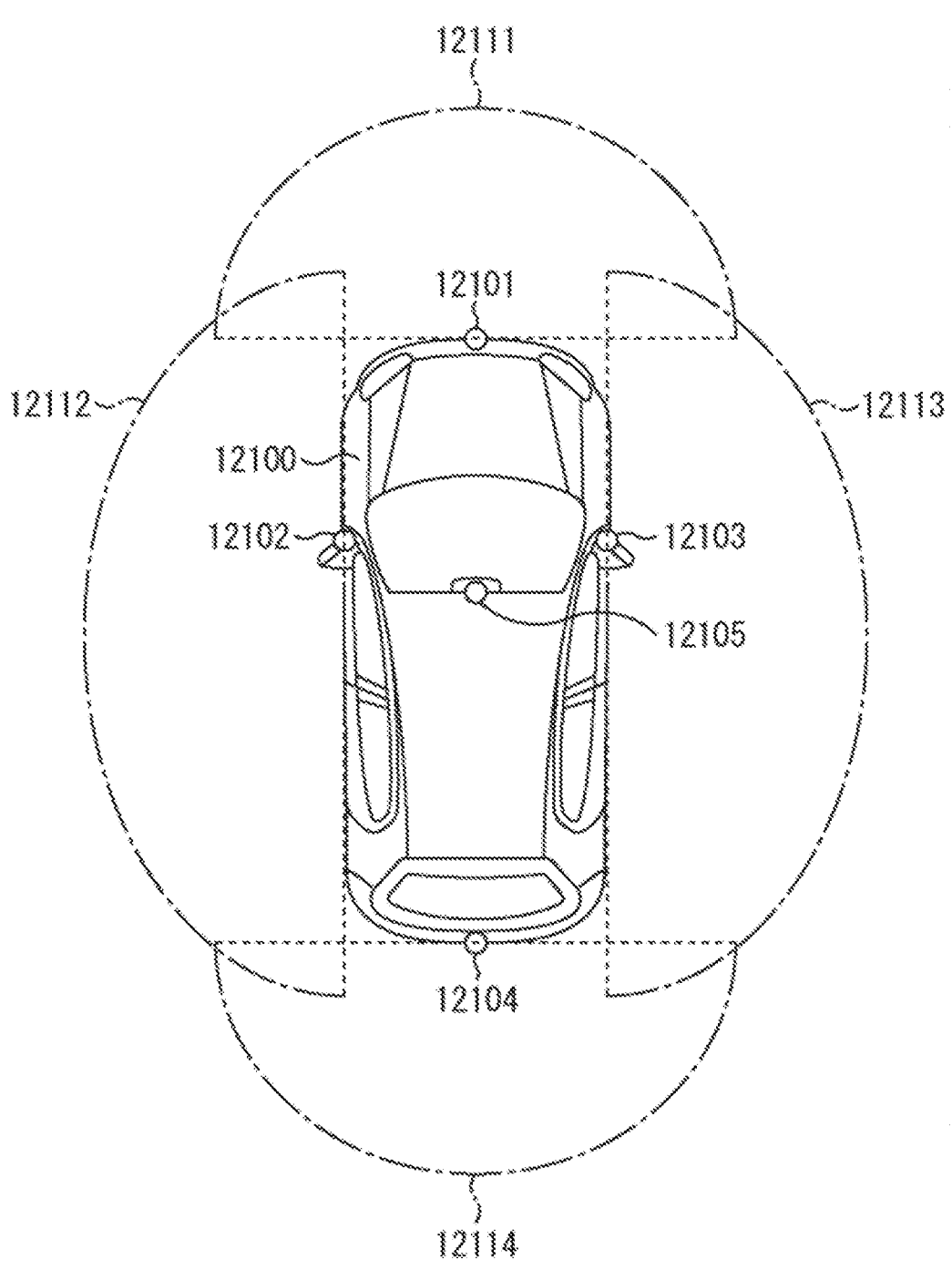
FIG. 38 is a diagram of assistance in explaining an example of installation positions of an outside-vehicle information detecting section and an imaging section.

FIG. 38 is a diagram depicting an example of the installation position of the imaging section 12031.

In FIG. 38, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of a vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 38 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technique according to the present disclosure can be applied has been described above. The technique according to the present disclosure can be applied to, for example, the driver state detecting section 12041 and the imaging section 12031 among the above-described configurations. By applying the technique according to the present disclosure to the driver state detecting section 12041, it is possible to quickly and accurately execute eye tracking of a driver or a passenger. Furthermore, by applying the technique according to the present disclosure to the imaging section 12031, it is possible to quickly and accurately acquire the traveling position and the posture of the vehicle 12100.

Although embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Furthermore, the effects of each embodiment described in the present specification are merely examples and are not limited, and other effects may be obtained.

It is noted that the present technique can also have the following configurations.

(1)

An information processing apparatus including:

a hybrid sensor including a plurality of photoelectric conversion units configured to photoelectrically convert incident light, and a signal processing unit configured to acquire, based on outputs of the plurality of photoelectric conversion units, a luminance signal based on a light intensity of the incident light or an event signal based on a luminance change;

a processor configured to perform predetermined processing based on the luminance signal or the event signal acquired by the signal processing unit; and an instruction generation unit configured to request the signal processing unit to read the luminance signal, wherein the instruction generation unit requests the signal processing unit to read the luminance signal when the processor fails in the predetermined processing based on the event signal, and the processor executes the predetermined processing based on the luminance signal input from the signal processing unit in response to the request.

(2)

The information processing apparatus according to (1), wherein the instruction generation unit requests the signal processing unit to read the luminance signal when the information processing apparatus is initialized.

(3)

The information processing apparatus according to (1) or (2), wherein the processor executes the predetermined processing based on frame data generated based on a plurality of the event signals.

(4)

The information processing apparatus according to (3), wherein the processor executes size adjustment of matching a size of image data generated based on the luminance signal with a size of the frame data, and then executes the predetermined processing on the size-adjusted image data.

(5)

The information processing apparatus according to any one of (1) to (4), wherein the predetermined processing is eye tracking or simultaneous localization and mapping (SLAM).

(6)

The information processing apparatus according to (5), wherein the predetermined processing is processing of detecting a pupil and/or a Purkinje image in the eye tracking.

(7)

The information processing apparatus according to (5), wherein the predetermined processing is processing of calculating a self-position and a self-posture in the SLAM.

37

(8)

The information processing apparatus according to any one of (1) to (7), wherein the signal processing unit includes:

a first signal processing unit connected to a plurality of first photoelectric conversion units among the plurality of photoelectric conversion units and configured to acquire the luminance signal; and a second signal processing unit connected to one or more second photoelectric conversion units among the plurality of photoelectric conversion units and configured to acquire the event signal.

(9)

The information processing apparatus according to (8), wherein the plurality of first photoelectric conversion units and the one or more second photoelectric conversion units are different photoelectric conversion units.

(10)

The information processing apparatus according to (8), wherein the one or more second photoelectric conversion units are some photoelectric conversion units of the plurality of first photoelectric conversion units.

(11)

The information processing apparatus according to any one of (8) to (10), wherein an optical axis of a first sensor is aligned with an optical axis of a second sensor, the first sensor being configured by the first photoelectric conversion unit and the first signal processing unit, and the second sensor being configured by the second photoelectric conversion unit and the second signal processing unit.

(12)

The information processing apparatus according to any one of (8) to (11), wherein the plurality of first photoelectric conversion units and the plurality of second photoelectric conversion units are arranged in a predetermined order on a light receiving surface of the same chip.

(13)

The information processing apparatus according to any one of (1) to (12), wherein the information processing apparatus is a head mounted display.

(14)

The information processing apparatus according to (13), wherein the head mounted display has an augmented reality (AR) function of providing augmented reality to a user or a virtual reality (VR) function of providing virtual space.

(15)

An information processing method executed in an information processing apparatus including a hybrid sensor including a plurality of photoelectric conversion units configured to photoelectrically convert incident light, and a signal processing unit configured to acquire, based on outputs of the plurality of photoelectric conversion units, a luminance signal based on a light intensity of the incident light or an event signal based on a luminance change, the method including:

a first process of executing predetermined processing based on a luminance image or the event signal acquired by the signal processing unit; and a second process of requesting the signal processing unit to read the luminance image, wherein

38 in the second process, the signal processing unit is requested to read the luminance image when the predetermined processing based on the event signal fails in the first process, and in the first process, the predetermined processing is executed based on the luminance image input from the signal processing unit in response to the request.

REFERENCE SIGNS LIST

1 INFORMATION PROCESSING APPARATUS
10, 10r, 10g, 10b, 10-0 to 10-3 LUMINANCE PIXEL
11, 11-0 to 11-3 TRANSFER TRANSISTOR
12 RESET TRANSISTOR
13 AMPLIFICATION TRANSISTOR
14 SELECTION TRANSISTOR
20, 20-0 to 20-3 EVENT PIXEL
21 DISCHARGE TRANSISTOR
100, 100L, 100R SOLID-STATE IMAGING DEVICE
101 PIXEL ARRAY UNIT
102A VERTICAL DRIVE CIRCUIT
102B HORIZONTAL DRIVE CIRCUIT
103A LUMINANCE SIGNAL PROCESSING CIRCUIT
103a AD CONVERSION CIRCUIT
103B EVENT SIGNAL PROCESSING CIRCUIT
103b SIGNAL PROCESSING CIRCUIT
104A X ARBITER
104B Y ARBITER
105 SYSTEM CONTROL CIRCUIT
108A LUMINANCE DATA PROCESSING UNIT
108B EVENT DATA PROCESSING UNIT
110, 110-1 UNIT PIXEL
111 PIXEL CIRCUIT
140 PIXEL CHIP
150 CIRCUIT CHIP
210 ADDRESS EVENT DETECTION CIRCUIT
211 LOGIC CIRCUIT
212, 212A LIGHT RECEIVING CIRCUIT
213 MEMORY CAPACITY
214 COMPARATOR
215 RESET CIRCUIT
216 INVERTER
217 OUTPUT CIRCUIT
312, 313, 315, 316 nMOS TRANSISTOR
314 PMOS TRANSISTOR
400, 400A, 410 AR DEVICE
401 FRAME
402L, 402R DISPLAY
403L, 403R LIGHT SOURCE
500, 510 VR DEVICE
501 FRAME
502L, 502R DISPLAY
503L, 503R LIGHT SOURCE
600 DEVICE
601 MAIN PROCESSOR
602 MAIN MEMORY
603 GRAPHICS PROCESSOR
604 DISPLAY
605 SPEAKER
606 COMMUNICATION UNIT
607 INERTIAL SENSOR
608 OPERATION DEVICE
609 ILLUMINATION DEVICE
610 EXTERNAL MEMORY
611 IMAGE SENSOR
612 EVS
613 SIGNAL INPUT UNIT

614 SIGNAL PROCESSING UNIT
615 INSTRUCTION GENERATION UNIT
901 SUBJECT
1010 LIGHT SOURCE
1011 LIGHT SOURCE DRIVE UNIT
1012 VCSEL
1021 SENSOR CONTROL UNIT
1022 LIGHT RECEIVING UNIT
1030 IRRADIATION LENS
1040 IMAGING LENS
1050 SYSTEM CONTROL UNIT
1100 APPLICATION PROCESSOR
FD FLOATING DIFFUSION REGION
LD1, LD2 PIXEL DRIVE LINE
PD, PD1, PD2, PD-0 to PD-3 PHOTOELECTRIC CON-
VERSION UNIT
VSL1, VSL2 VERTICAL SIGNAL LINE

The invention claimed is:

1. An information processing apparatus including:
a hybrid sensor including a plurality of photoelectric
conversion units configured to photoelectrically con-
vert incident light, and a signal processing unit config-
ured to acquire, based on outputs of the plurality of
photoelectric conversion units, a luminance signal
based on a light intensity of the incident light or an
event signal based on a luminance change;
a processor configured to perform predetermined process-
ing based on the luminance signal or the event signal
acquired by the signal processing unit; and
an instruction generation unit configured to request the
signal processing unit to read the luminance signal,
wherein
the instruction generation unit requests the signal pro-
cessing unit to read the luminance signal when the
processor fails in the predetermined processing based
on the event signal, and
the processor executes the predetermined processing
based on the luminance signal input from the signal
processing unit in response to the request.
2. The information processing apparatus according to
claim 1, wherein
the instruction generation unit requests the signal pro-
cessing unit to read the luminance signal when the
information processing apparatus is initialized.
3. The information processing apparatus according to
claim 1, wherein
the processor executes the predetermined processing
based on frame data generated based on a plurality of
the event signals.
4. The information processing apparatus according to
claim 3, wherein
the processor executes size adjustment of matching a size
of image data generated based on the luminance signal
with a size of the frame data, and then executes the
predetermined processing on the size-adjusted image
data.
5. The information processing apparatus according to
claim 1, wherein
the predetermined processing is eye tracking or simulta-
neous localization and mapping (SLAM).
6. The information processing apparatus according to
claim 5, wherein
the predetermined processing is processing of detecting a
pupil and/or a Purkinje image in the eye tracking.
7. The information processing apparatus according to
claim 5, wherein the predetermined processing is processing of calculating
a self-position and a self-posture in the SLAM.
8. The information processing apparatus according to
claim 1, wherein
the signal processing unit includes:
a first signal processing unit connected to a plurality of
first photoelectric conversion units among the plurality
of photoelectric conversion units and configured to
acquire the luminance signal; and
a second signal processing unit connected to one or more
second photoelectric conversion units among the plu-
rality of photoelectric conversion units and configured
to acquire the event signal.
9. The information processing apparatus according to
claim 8, wherein
the plurality of first photoelectric conversion units and the
one or more second photoelectric conversion units are
different photoelectric conversion units.
10. The information processing apparatus according to
claim 8, wherein
the one or more second photoelectric conversion units are
some photoelectric conversion units of the plurality of
first photoelectric conversion units.
11. The information processing apparatus according to
claim 8, wherein
an optical axis of a first sensor is aligned with an optical
axis of a second sensor, the first sensor being config-
ured by the first photoelectric conversion unit and the
first signal processing unit, and the second sensor being
configured by the second photoelectric conversion unit
and the second signal processing unit.
12. The information processing apparatus according to
claim 8, wherein
the plurality of first photoelectric conversion units and the
plurality of second photoelectric conversion units are
arranged in a predetermined order on a light receiving
surface of the same chip.
13. The information processing apparatus according to
claim 1, wherein
the information processing apparatus is a head mounted
display.
14. The information processing apparatus according to
claim 13, wherein
the head mounted display has an augmented reality (AR)
function of providing augmented reality to a user or a
virtual reality (VR) function of providing virtual space.
15. An information processing method executed in an
information processing apparatus including a hybrid sensor
including a plurality of photoelectric conversion units con-
figured to photoelectrically convert incident light, and a
signal processing unit configured to acquire, based on out-
puts of the plurality of photoelectric conversion units, a
luminance signal based on a light intensity of the incident
light or an event signal based on a luminance change, the
method including:
a first process of executing predetermined processing
based on a luminance image or the event signal
acquired by the signal processing unit; and
a second process of requesting the signal processing unit
to read the luminance image, wherein
in the second process, the signal processing unit is
requested to read the luminance image when the pre-
determined processing based on the event signal fails in
the first process, and in the first process, the predetermined processing is
executed based on the luminance image input from the
signal processing unit in response to the request.

* * * * *